(12) United States Patent
Ripa et al.

(10) Patent No.: US 12,248,285 B2
(45) Date of Patent: Mar. 11, 2025

(54) AUTOMATIC DATA TRANSFER BETWEEN A SOURCE AND A TARGET USING SEMANTIC ARTIFICIAL INTELLIGENCE FOR ROBOTIC PROCESS AUTOMATION

(71) Applicant: UiPath, Inc., New York, NY (US)

(72) Inventors: Bogdan Ripa, Bucharest (RO); Mircea Grigore, Bucharest (RO); Cosmin Voicu, Bucharest (RO)

(73) Assignee: UiPath, Inc., New York, NY (US)

( * ) Notice: Subject to any disclaimer, the term of this patent is extended or adjusted under 35 U.S.C. 154(b) by 394 days.

(21) Appl. No.: 17/746,855

(22) Filed: May 17, 2022

(65) Prior Publication Data

US 2023/0107316 A1  Apr. 6, 2023

Related U.S. Application Data

(63) Continuation-in-part of application No. 17/494,744, filed on Oct. 5, 2021, now Pat. No. 12,124,806.

(51) Int. Cl.
*G06Q 10/06* (2023.01)
*G05B 13/04* (2006.01)
(Continued)

(52) U.S. Cl.
CPC .............. *G05B 13/04* (2013.01); *G06F 9/543* (2013.01); *G06F 18/22* (2023.01); *G06F 40/30* (2020.01); *G06V 30/10* (2022.01)

(58) Field of Classification Search
CPC .................................................... G06Q 10/06
(Continued)

(56) References Cited

U.S. PATENT DOCUMENTS

| 7,624,353 B2 | 11/2009 | Beumer |
| 10,860,905 B1 | 12/2020 | Gligan et al. |

(Continued)

FOREIGN PATENT DOCUMENTS

| CN | 112231033 A | 1/2021 |
| CN | 112967132 A | 6/2021 |

(Continued)

OTHER PUBLICATIONS

Extended European Search Report, issued Feb. 8, 2024, European Patent Application No. EP21820901.3.
(Continued)

*Primary Examiner* — Nga B Nguyen
(74) *Attorney, Agent, or Firm* — LeonardPatel PC; Michael A. Leonard, II; Sheetal S. Patel

(57) ABSTRACT

Automatic data transfer between a source and a target using semantic artificial intelligence (AI) for robotic process automation (RPA) is disclosed. A user may be provided with the option of selecting a source and a target and indicating through an intuitive user interface that he or she would like to copy data from the source to the destination, regardless of format. This may be done at design time or at run time. For instance, the source and/or target may be a web page, a graphical user interface (GUI) of an application, an image, a file explorer, a spreadsheet, a relational database, a flat file source, any other suitable format, or any combination thereof. The source and the target may have different formats. The source, target, or both may not necessarily be visible to the user.

38 Claims, 26 Drawing Sheets

(51) Int. Cl.
*G06F 9/54* (2006.01)
*G06F 18/22* (2023.01)
*G06F 40/30* (2020.01)
*G06V 30/10* (2022.01)

(58) Field of Classification Search
USPC .................................................. 705/7.26
See application file for complete search history.

(56) References Cited

U.S. PATENT DOCUMENTS

| | | | |
|---|---|---|---|
| 10,936,351 | B2 | 3/2021 | Voicu |
| 11,200,073 | B1 | 12/2021 | Voicu |
| 2008/0027930 | A1* | 1/2008 | Bohannon ............... G06F 16/20 |
| 2018/0032626 | A1* | 2/2018 | Ben-Aharon ......... G06F 16/951 |
| 2019/0213039 | A1* | 7/2019 | Lecue .................... G06N 3/044 |
| 2019/0213252 | A1 | 7/2019 | Simard et al. |
| 2019/0318020 | A1 | 10/2019 | Chauhan et al. |
| 2020/0249964 | A1 | 8/2020 | Fernandes et al. |
| 2020/0366566 | A1 | 11/2020 | Avasarala et al. |
| 2021/0019157 | A1 | 1/2021 | Voicu |
| 2021/0019574 | A1 | 1/2021 | Voicu |
| 2021/0089332 | A1 | 3/2021 | Zohar et al. |
| 2021/0097274 | A1 | 4/2021 | Gligan et al. |
| 2021/0109834 | A1 | 4/2021 | Singh et al. |
| 2021/0294945 | A1 | 9/2021 | Müller et al. |
| 2021/0334470 | A1* | 10/2021 | Molin .................... G06F 40/30 |
| 2021/0397157 | A1 | 12/2021 | Cote et al. |
| 2022/0011732 | A1 | 1/2022 | Hall |
| 2022/0012024 | A1 | 1/2022 | Grigore |
| 2022/0197674 | A1 | 6/2022 | Ginoya et al. |
| 2022/0317978 | A1 | 10/2022 | Barik et al. |
| 2023/0182296 | A1* | 6/2023 | Sermanet ............... B25J 9/1664 700/245 |

FOREIGN PATENT DOCUMENTS

| | | |
|---|---|---|
| CN | 113435160 A | 9/2021 |
| WO | 2020061700 A1 | 4/2020 |
| WO | 2021055102 A1 | 3/2021 |

OTHER PUBLICATIONS

International Search Report, issued Jun. 22, 2022, PCT Application No. PCT/US21/57169.
Chuan Guo et al., "On Calibration of Modern Neural Networks," Proceedings of the 34th International Conference on Machine Learning, PMLR 70:1321-1330 (2017).
Jitterbit Mapping Mode Page available at https://success.jitterbit.com/display/CS/Mapping+Mode (last updated Oct. 20, 2021).
Jonathan Grandperrin, "How to use confidence scores in machine learning models," available at https://towardsdatascience.com/how-to-use-confidence-scores-in-machine-learning-models-abe9773306fa (Jan. 19, 2021).
Mappings in Informatica Page available at https://www.guru99.com/mappings-informatica.html (Last updated Oct. 7, 2021).
Nils Reimers et al., "Sentence-BERT: Sentence Embeddings using Siamese BERT-Networks," available at https:// arxiv.org/pdf/1908.10084.pdf (Aug. 27, 2019).
Pratik Shukla et al., "Main Types of Neural Networks and Their Applications - Tutorial," available at https://pub.towardsai.net/main-types-of-neural-networks-and-its-applications-tutorial-734480d7ec8e (last updated Aug. 15, 2021).
SBERT.net SentenceTransformers Documentation available at https://www.sbert.net/ (last accessed Oct. 4, 2021).
Tony Yiu, "Understanding Neural Networks," available at https://towardsdatascience.com/understanding-neural-networks-19020b758230 (Jun. 2, 2019).
JiPath Object Repository Page available at https://docs.uipath.com/studio/docs/about-object-repository (last accessed Oct. 4, 2021).
European Search Report issued in European Application No. 22199898.2 on Feb. 8, 2023.
Giunchiglia et al., "Semantic Matching," The Knowledge Engineering Review, Cambridge University Press, vol. 18, No. 3, pp. 265-280 (Sep. 1, 2003).
Lasker et al., "Semi-Supervised Semantic Matching," Pattern Recognition : 5ht Asian Conference, ACPR, Auckland, New Zealand, Nov. 26-29, 2019, LNCS 11131, pp. 444-455 (Jan. 23, 2019).
Chakrabarti, et al., "TableQnA: Answering List Intent Queries with Web Tables", arXiv preprint arXiv:2001.04828. Jan. 1, 20200. (Year: 2020).
Chuen-Meei Gan, "Non-Final Office Action", issued Sep. 19, 2024, U.S. Appl. No. 18/068,642.
Chuen-Meei Gan, "Notice of Allowance", issued Aug. 21, 2024, U.S. Appl. No. 17/494,744.
Chuen-Meei Gan, "Notice of Allowance", issued Aug. 26, 2024, U.S. Appl. No. 18/052,378.
Nga B Nguyen, "Non-Final Office Action", issued Oct. 24, 2024, U.S. Appl. No. 18/056,018.
Reddy, et al. "A Study of Robotic Process Automation Among Artificial Intelligence", International Journal of Scientific and Research Publications. Feb. 2019;9(2):392-7. (Year: 2019).
Reddy, et al., "A Study of Robotic Process Automation Among Artificial Intelligence", International Journal of Scientific and Research Publications, Feb. 20199(2): 392-7.
Taulli, et al., "Robotic Process Automation (RPA) An Easier Path to AI. Artificial Intelligence Basics: A Non-Technical Introduction", 2019: 91-102.
Taulli, Tom, "Robotic Process Automation (RPA) An Easier Path to AI. Artificial Intelligence Basics: A Non-Technical Introduction", 2019:91-102. (Year: 2019).

* cited by examiner

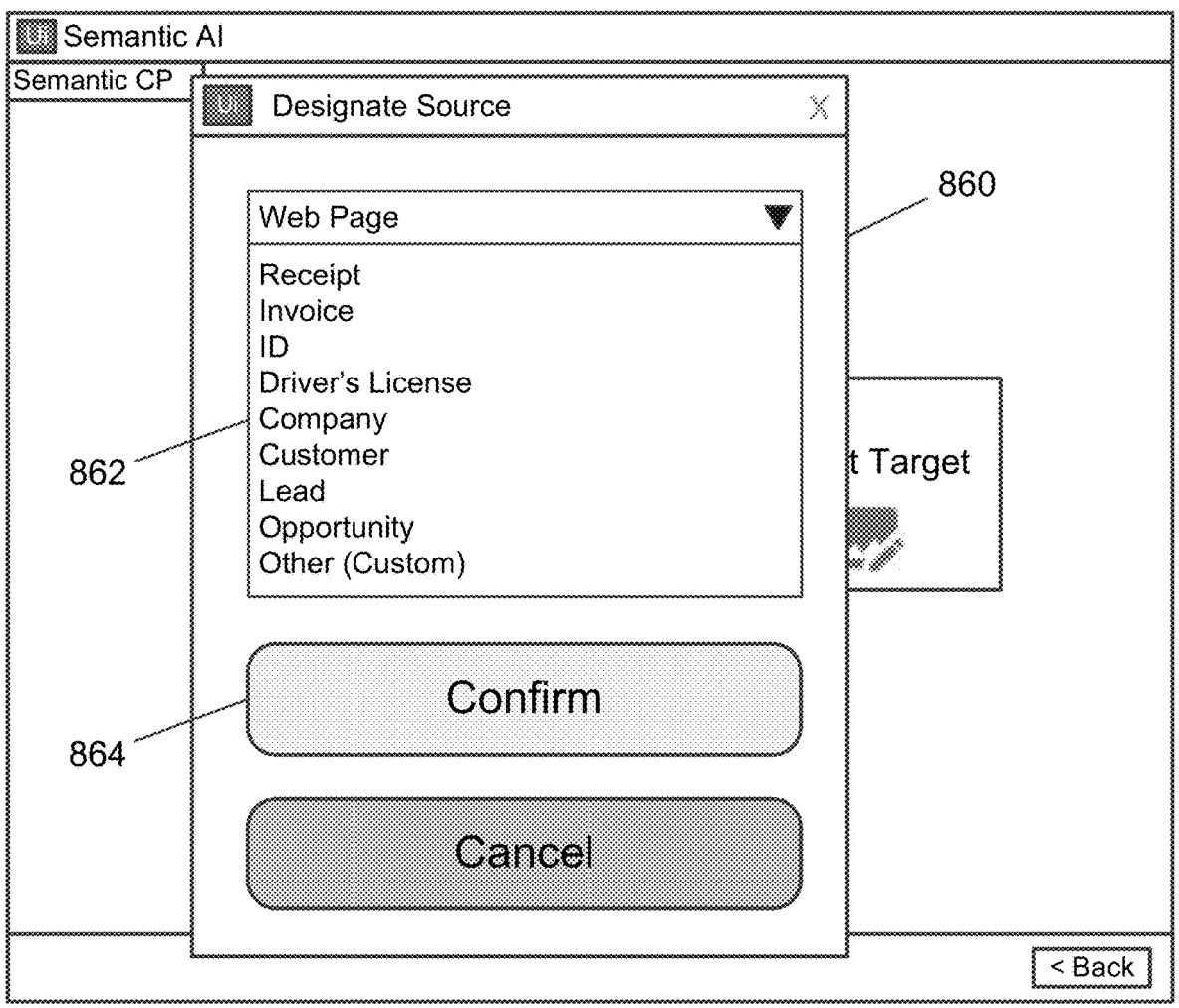

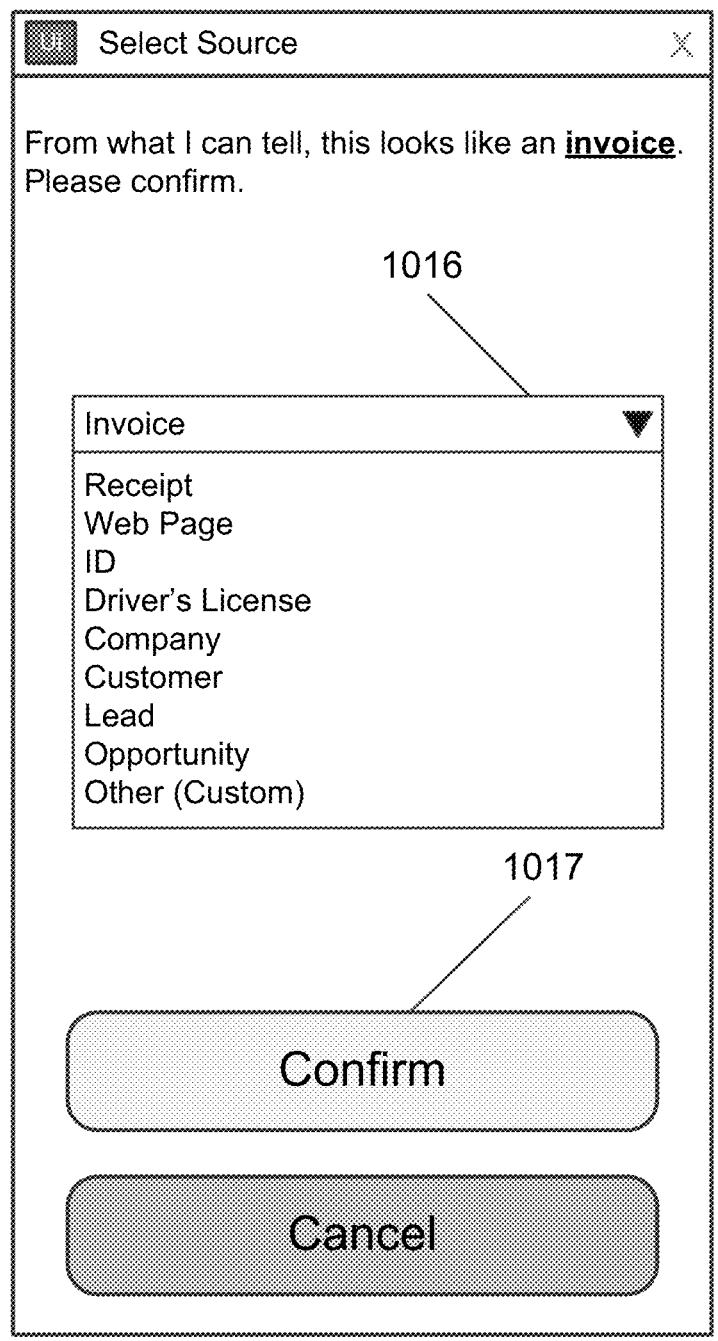

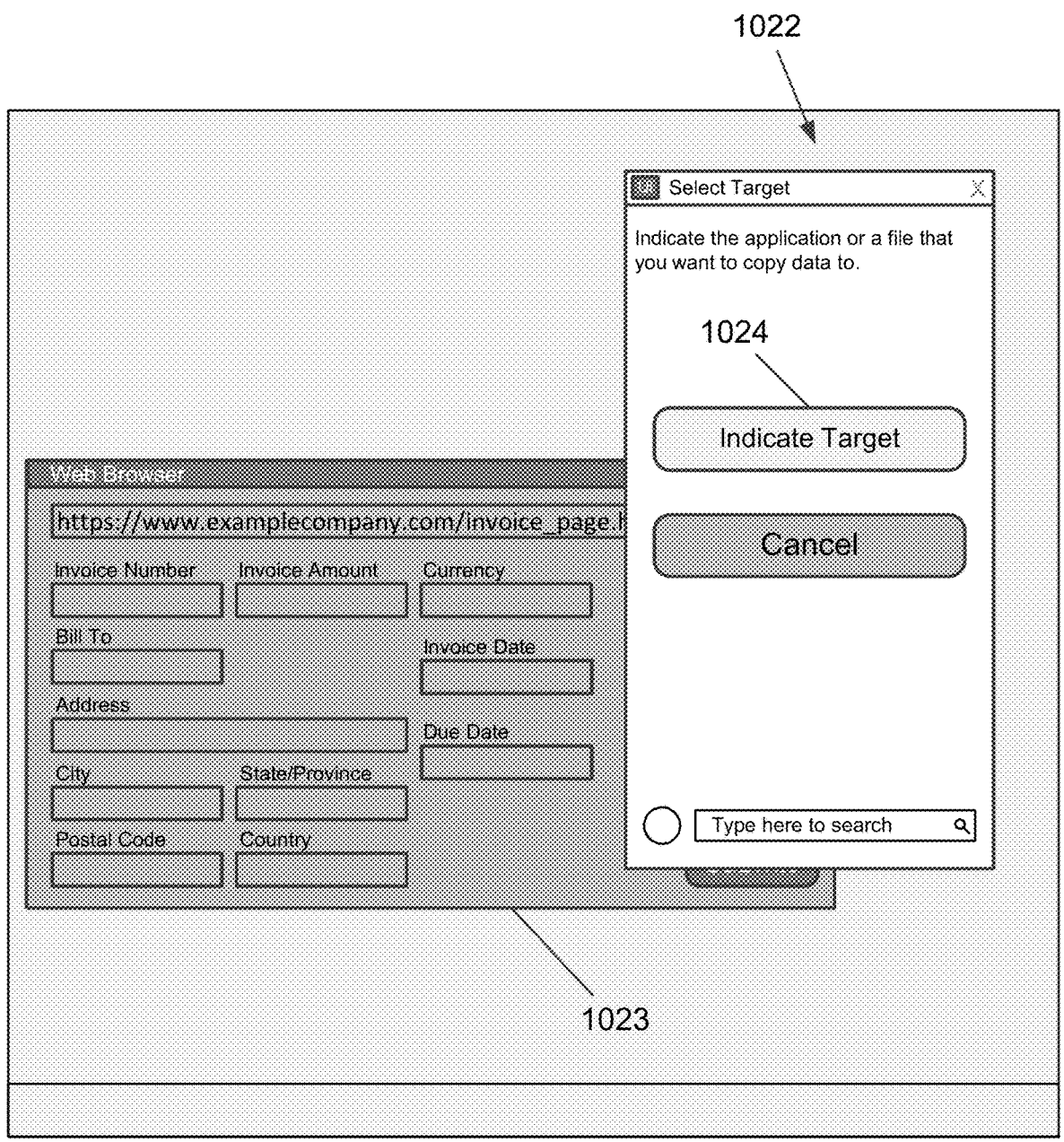

FIG. 10H

```
Web Browser                                                          ☒
┌─────────────────────────────────────────────────────────────────────┐
│ https://www.examplecompany.com/invoice_page.html                    │
└─────────────────────────────────────────────────────────────────────┘
Invoice Number    Invoice Amount    Currency
┌──────────────┐  ┌──────────────┐  ┌──────────────┐
│ 1234         │  │ 1299.93      │  │ USD          │
└──────────────┘  └──────────────┘  └──────────────┘
Bill To                             Invoice Date
┌──────────────┐                    ┌──────────────┐
│ John Smith   │                    │ 9/27/2021    │
└──────────────┘                    └──────────────┘
Address
┌──────────────────────────────┐    Due Date
│ 123 Main Street              │    ┌──────────────┐
└──────────────────────────────┘    │ 10/27/2021   │
City              State/Province    └──────────────┘
┌──────────────┐  ┌──────────────┐
│ Saskatoon    │  │ Saskatchewan │
└──────────────┘  └──────────────┘
Postal Code       Country
┌──────────────┐  ┌──────────────┐       ( Submit )
│ S0K 0Y0      │  │ Canada       │
└──────────────┘  └──────────────┘
```

1023

AUTOMATIC DATA TRANSFER BETWEEN A SOURCE AND A TARGET USING SEMANTIC ARTIFICIAL INTELLIGENCE FOR ROBOTIC PROCESS AUTOMATION

CROSS-REFERENCE TO RELATED APPLICATION

This application is a continuation-in-part (CIP) of U.S. Nonprovisional patent application Ser. No. 17/494,744 filed Oct. 5, 2021. The subject matter of this earlier filed application is hereby incorporated by reference in its entirety.

FIELD

The present invention generally relates to semantic matching, and more specifically, to automatic data transfer between a source and a target using semantic artificial intelligence (AI) for robotic process automation (RPA).

BACKGROUND

Currently, developers need to manually create robotic process automation (RPA) workflows in an RPA designer application using activities. While creating the RPA workflow, the developer needs to indicate the target graphical element on the screen, which causes the RPA designer application to automatically generate a selector corresponding to the target element with a set of anchors. Although activity recommendation and suggestion functionality currently exists in UiPath Studio™, for example, fully automated RPA workflow creation is not supported, nor is intuitive data transfer from a source to a target. Indicating all of the target graphical elements manually while creating the RPA workflow is time consuming. Accordingly, an improved and/or alternative approach may be beneficial.

SUMMARY

Certain embodiments of the present invention may provide solutions to the problems and needs in the art that have not yet been fully identified, appreciated, or solved by current RPA technologies. For example, some embodiments of the present invention pertain to automatic data transfer between a source and a target using semantic AI for RPA.

In an embodiment, a non-transitory computer-readable medium stores a computer program. The computer program is configured to cause at least one processor to receive a selection of a source and receive a selection of a target. The computer program is also configured to cause the at least one processor to call one or more AI/ML models that have been trained to perform semantic matching between labels in the source and labels in the target, between values in the source and the labels in the target, or both. The computer program is further configured to cause the at least one processor to copy values from the source to the target based on the semantic matching between the labels in the source and the labels in the target, between the values in the source and the labels in the target, or both.

In another embodiment, a computer-implemented method includes calling, by a computing system, one or more AI/ML models that have been trained to perform semantic matching between labels in a source and labels in a target, between values in the source and the labels in the target, or both. The computer-implemented method also includes copying values from the source to the target, by the computing system, based on the semantic matching between the labels in the source and the labels in the target, between the values in the source and the labels in the target, or both.

In yet another embodiment, a computing system includes memory storing computer program instructions and at least one processor configured to execute the computer program instructions. The computer program instructions are configured to cause the at least one processor to call one or more AI/ML models that have been trained to perform semantic matching between labels in the source and labels in the target, between values in the source and the labels in the target, or both. The computer program instructions are also configured to cause the at least one processor to copy values from the source to the target based on the semantic matching between the labels in the source and the labels in the target, between the values in the source and the labels in the target, or both. The computer program instructions are or include an RPA designer application or an RPA robot.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIGS. 8A-D illustrate a matching interface for an RPA designer application, according to an embodiment of the present invention.

FIGS. 10A-H illustrate screens of an example semantic copy and paste interface, according to an embodiment of the present invention.

Unless otherwise indicated, similar reference characters denote corresponding features consistently throughout the attached drawings.

DETAILED DESCRIPTION OF THE EMBODIMENTS

Figure 1:
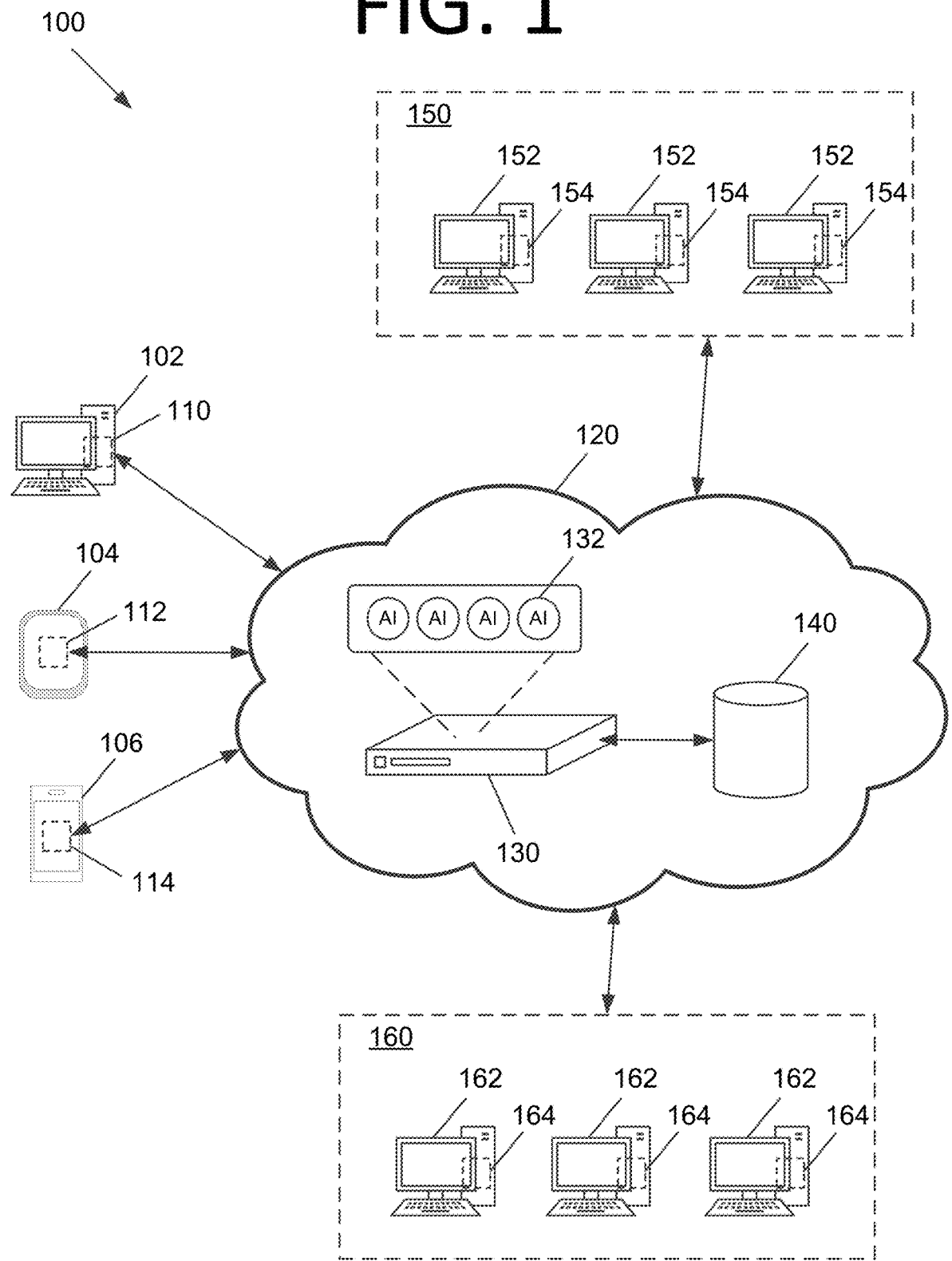
FIG. 1 is an architectural diagram illustrating a hyperautomation system, according to an embodiment of the present invention.

Some embodiments pertain to automatic data transfer between a source and a target using semantic AI for RPA. Most manual tasks can be reduced to going to a source, going field by field, and putting the information in a destination (e.g., inputting the contents of an invoice into a billing system). Some embodiments provide a user with the option of selecting a source and a target and indicating through an intuitive user interface that he or she would like to copy data from the source to the destination, regardless of format. For instance, the source and/or target may be a web page, a graphical user interface (GUI) of an application, an image, a file explorer, a spreadsheet, a relational database, a flat file source, any other suitable format, or any combination thereof. In some embodiments, the source and target may have different formats, such as the source being a PDF and the target being a user interface of a billing application. In certain embodiments, the source, target, or both may not be visible to the user.

In some embodiments, AI/ML model(s) may be used to extract the information from the source (e.g., key-value pairs, labels and associated values, etc.) and target (e.g., labels and text fields corresponding to those labels). The AI/ML model(s) may include, but are not limited to, a computer vision (CV) model, an optical character recognition (OCR) module, a document processing module, etc. A semantic matching module is then employed to map labels and values in the source to labels and associated fields, UI elements, file locations, or any other suitable location to copy the values without deviating from the scope of the invention. Once mapped, the values are copied automatically from the source to the destination.

In some embodiments, if a label with a value in the source is not matched to a label in the target with at least a certain matching threshold (e.g., 75%, 90%, etc.), various actions may be taken. For instance, the label and its value from the source may be ignored. Alternatively, the user may be prompted to identify whether a corresponding label exists in the target and to provide the identification. In certain embodiments, the user may be shown a list of potential matching candidates that have a confidence value that is less than the matching threshold, but more than a display threshold (e.g., 35%, 50%, etc.).

In some embodiments, target-based schema identification may be employed. When looking at a source, such as a document, a web form, a user interface of a software application, a data file, etc., it is often difficult for software to determine which fields are labels and which are values associated with those labels. Values may include, but are not limited to, text strings, numbers, etc. However, a target template document, web form, user interface of a software application, etc. lacking such values may be analyzed to detect labels therein. Since values have not yet been entered for various labels (e.g., first name, company, customer number, etc.), these labels are easier to detect than when the target also includes various values associated with the labels.

However, in some embodiments, the source may not have a schema per-se. In such cases, a natural language processing (NLP) model may be employed. For instance, GPT-3 may be used, which is an autoregressive language model that uses deep learning to produce human-like text. The inputs to the NLP model may be the source document and a description of what the user wants to extract (e.g., in the form of a paragraph of text) in plain English. The source document may then be analyzed and information therein may be extracted using the NLP model based on this input. Semantic understanding is applied to the text of the document as a whole by the NLP model to "guess" which information is desired.

Human language may be separated into fragments and analyze the grammatical structure of sentences and the meaning of words in context. This helps software employing NLP to read and understand spoken or written text in a similar manner to humans. Sentences may be broken down into tokens, which are smaller semantic units or fragments, via tokenization. Parts of speech may be tagged as well, such as marking words as nouns, verbs, adjectives, adverbs, pronouns, etc. Stemming and lemmatization may be used to standardize words by reducing them to their root forms. Also, stop words may be removed. These are common words that add little or no unique information, such as prepositions and articles (e.g., at, to, a, the, etc.). The NLP model can then be run on this information to extract useful information.

Some embodiments may be attended or unattended, as described in further detail with respect to FIGS. 1 and 2 below. For attended embodiments, in some aspects, if a user clicks on a field because its value is incorrect, other scored options may appear for the user to select. Similarity of candidates may be ranked using any suitable similarity measure and/or measure for an amount of mismatch between two values without deviating from the scope of the invention. For instance, in various embodiments, the similarity threshold may represent a maximum amount of mismatch or a minimum amount of similarity required for a match. The similarity measure may be expressed in various ways, such as according to an inter-string distance known as a "string metric." One example string metric known as the Levenshtein distance determines a count of operations necessary to transform one string into the other. Other inter-string distances include the Hamming distance and the Jaro-Winkler distance, among others.

Depending on the chosen manner of computing the similarity measure, the similarity threshold can have various interpretations. For instance, the similarity threshold may indicate a maximum count of characters that can differ between the two strings or a fractional degree of mismatch calculated as a proportion of the total count of characters (e.g., combined string length). In some embodiments, the similarity threshold may be re-scaled to a predetermined interval, such as between 0 and 1, between 0 and 100, between 7 and 34, etc. In one nonlimiting example, a relatively high similarity threshold (e.g., close to 1 or 100%)

indicates a requirement for an almost exact match, i.e., the value of the fuzzy attribute in the runtime target is only allowed to depart very slightly from the value of the respective attribute in the design time target. In contrast, when the similarity threshold is relatively low (e.g., close to 0), almost any values of the respective fuzzy attribute are considered as matching. Some allow adjusting the similarity threshold at design time, for instance by way of a slider.

Whereas existing techniques use multiple or many source examples to learn key-value pairs from the source, some embodiments essentially operate in reverse. Labels are determined from an empty target. Per the above, the source and the target can have different types. For instance, one may be a web page while the other is an Excel® spreadsheet. Even images of a graphical user interface (GUI) could be used by employing computer vision (CV), optical character recognition (OCR), and/or a document processing framework. See, for example, U.S. Patent Application Publication No. 2021/0097274, the subject matter of which is hereby incorporated by reference in its entirety. Such techniques can be used to classify the source and/or the target.

Users may provide training information for building libraries for certain types of targets. For instance, CV, OCR, and document processing artificial intelligence (AI)/machine learning (ML) models may be provided "out of the box" that are capable of achieving an accuracy of 70%. As users provide corrections for incorrect values and/or label-value associations, these may be used to retrain the respective AI/ML model, increasing its accuracy.

In some embodiments, analytics may be performed on the user interactions with the software to determine tasks that are used the most. These may be reported to a Center of Excellence (COE) and used as a form of task mining. Using current task mining technologies, it is difficult to identify the start and end of certain repetitive tasks. However, by analyzing the way that the user performs a copy and paste operation, some embodiments can identify where the task started and where it ended. "Copy" could signify the start of a copy-and-paste task and "paste" could signify the end of such a task. The actions performed in between the copy and the paste can be included as a flow of tasks in a workflow. Furthermore, a reliable and effective workflow that can be created using this information.

In certain embodiments, both local and global AI/ML models may be included. For instance, the local AI/ML model may learn preferences of a given user while the global AI/ML model learns collective preferences from many or all users. A threshold may be required to use a result from an AI/ML model. For instance, if the local model is employed first and does not meet the suggestion threshold for one or more attributes, the global model may be tried to see if it comes up with a useful result.

In order to perform target-based schema identification, a user may select a target that does not yet have values. Using CV, OCR, and/or document processing AI/ML models, the labels, or "keys," are determined in the target, as well as their locations. This allows the system to determine the type of the target. For instance, a web form tends to have rectangular text fields to the right of the respective label for that text field. An invoice will tend to have certain fields, such as customer number, the word "invoice," some variation of "amount," etc. The location(s) of the labels may also be used to assist in the determination. For instance, text fields often tend to be arranged vertically with one above and one below, except at the top or bottom of the column of text fields. Anchor or multi-anchor-based extraction may be performed in some embodiments, such as using the techniques disclosed in U.S. Pat. No. 10,936,351.

In some embodiments, the source data or source screen and the target screen are selected on a matching interface, and label and schema identification, semantic matching, and transferring (e.g., copy-and-pasting) the data for matched labels from the source to the target is performed automatically without further action by the user. Such functionality may be provided at design time for RPA developers (including citizen developers) and at runtime for end users. In some design time embodiments, one or more RPA workflow activities are automatically created based on the semantic mapping that can be executed to perform the semantic AI functionality as part of an automation executed by an RPA robot.

In some embodiments, a list of data fields may be obtained, such as from an Excel® spreadsheet, a relational database, a flat file source, etc. The semantic matching AI/ML model may iterate over the entries in the source data and match them to labels and corresponding data entry locations in the target. The semantic matching AI/ML model may be trained to do this regardless of the type of the data source. Due to the semantic matching functionality of this AI/ML model, a 1-to-1 matching may not be required. For instance, a natural language model may seek to match identical or similar names/phrases in a target screen to those in the source data (or start with the source data and look for similar names/phrases in the target screen). In certain embodiments, an extensive set of training data is used to make the semantic matching AI/ML model more accurate since there may be many similar words or phrases for certain terms and there may also be many different subsets depending on context. In some embodiments, context may also be used. For instance, the semantic matching AI/ML model may learn that a given target pertains to banking details vs. an invoice, vs. a purchase order vs. contact information, etc.

The semantic matching AI/ML model of some embodiments may be deployed to assist RPA developers during design time. However, in some embodiments, the semantic matching AI/ML model may be used at runtime to provide more robust functionality and self-healing. This may be employed if the UI descriptor fails to identify the target graphical element at runtime rather than generally in some embodiments since UI descriptors tend to be considerably faster than semantic matching AI/ML models. As such, UI descriptors should be employed first for the same or similar target screens.

For instance, if a given target element cannot be identified by a given user interface (UI) descriptor at runtime, such as if a UI changes due to a new version of a target application, the semantic matching AI/ML model may be used to attempt to identify the target graphical element. This information may then be added as a synonym for the word or phrase of interest, and the UI descriptor for that graphical element may be updated such that the UI descriptor will work going forward. If the user interface changes yet again and the changed graphical element and/or anchor(s) are similar enough, the RPA robot may be able to identify the target graphical element in the new version of the application. See U.S. Patent Application Publication No. 2022/0012024, for example.

A UI descriptor is a set of instructions for finding a UI element. UI descriptors in some embodiments are an encapsulated data/struct format that includes UI element selector(s), anchor selector(s), computer vision (CV) descriptor(s), unified target descriptor(s), a screen image capture (context), an element image capture, other metadata (e.g., the application and application version), a combination thereof, etc. The encapsulated data/struct format may be extensible with future updates to the platform and is not limited to the above definition. Any suitable UI descriptor for identifying a UI element on a screen may be used without deviating from the scope of the invention.

In some embodiments, what the semantic matching AI/ML model is detecting may be combined with unified target descriptors for runtime detection. For such embodiments, in addition to words and phrases for the source and target, once mappings are confirmed, unified target information may be collected. At runtime, the unified target descriptor may be tried first, and if not successful, the semantic matching AI/ML model may be used.

Unified target descriptors tend to be more stable and accurate than AI/ML models. A unified target descriptor chains together multiple types of UI descriptors. Unified target information includes UI descriptor information that facilitates identification of graphical elements for the UI descriptor(s) that are employed.

A unified target descriptor may function like a finite state machine (FSM), where in a first context, a first UI descriptor mechanism is applied, in a second context, a second UI descriptor is applied, etc. In other words, the UI descriptors may work with a unified target that encompasses some or all UI detection mechanisms through which image detection and definition are performed in some embodiments. The unified target may merge multiple techniques of identifying and automating UI elements into a single cohesive approach. The unified target may prioritize certain UI descriptor types in some embodiments, such as prioritizing selector-based and driver-based UI detection mechanisms and using CV as a fallback to find a target UI element if the first two mechanisms are not successful.

In some embodiments, an NLP AI/ML model may be used in addition to or in lieu of a semantic matching AI/ML model. In certain embodiments, these AI/ML models may be used together. For instance, if one of the models meets or exceeds a certain threshold, if the average of both of the models meets or exceeds a threshold, etc., a match may be proposed to the user.

In some embodiments, feedback loop functionality is provided. For instance, if a user adds a match or corrects a match proposed by the semantic matching AI/ML model, information pertaining to this match may be saved. This information may include, but is not limited to, a screenshot of the target application, the label in the target application and the corresponding label in the source screen or source data, the label of the incorrect match, etc. The context may also be captured, such as that the correction occurred for a webpage, SAP®, etc. This data may be used in conjunction with other labeled data collected in this manner to retrain the semantic matching AI/ML model.

FIG. 1 is an architectural diagram illustrating a hyper-automation system 100, according to an embodiment of the present invention. "Hyper-automation," as used herein, refers to automation systems that bring together components of process automation, integration tools, and technologies that amplify the ability to automate work. For instance, RPA may be used at the core of a hyper-automation system in some embodiments, and in certain embodiments, automation capabilities may be expanded with artificial intelligence (AI)/machine learning (ML), process mining, analytics, and/or other advanced tools. As the hyper-automation system learns processes, trains AI/ML models, and employs analytics, for example, more and more knowledge work may be automated, and computing systems in an organization, e.g., both those used by individuals and those that run autonomously, may all be engaged to be participants in the hyper-automation process. Hyper-automation systems of some embodiments allow users and organizations to efficiently and effectively discover, understand, and scale automations.

Hyper-automation system 100 includes user computing systems, such as desktop computer 102, tablet 104, and smart phone 106. However, any desired user computing system may be used without deviating from the scope of the invention including, but not limited to, smart watches, laptop computers, servers, Internet-of-Things (IoT) devices, etc. Also, while three user computing systems are shown in FIG. 1, any suitable number of user computing systems may be used without deviating from the scope of the invention. For instance, in some embodiments, dozens, hundreds, thousands, or millions of user computing systems may be used. The user computing systems may be actively used by a user or run automatically without much or any user input.

Each user computing system 102, 104, 106 has respective automation process(es) 110, 112, 114 running thereon. Automation process(es) 110, 112, 114 may include, but are not limited to, RPA robots, part of an operating system, downloadable application(s) for the respective computing system, any other suitable software and/or hardware, or any combination of these without deviating from the scope of the invention. In some embodiments, one or more of process(es) 110, 112, 114 may be listeners. Listeners may be RPA robots, part of an operating system, a downloadable application for the respective computing system, or any other software and/or hardware without deviating from the scope of the invention. Indeed, in some embodiments, the logic of the listener(s) is implemented partially or completely via physical hardware.

Listeners monitor and record data pertaining to user interactions with respective computing systems and/or operations of unattended computing systems and send the data to a core hyper-automation system 120 via a network (e.g., a local area network (LAN), a mobile communications network, a satellite communications network, the Internet, any combination thereof, etc.). The data may include, but is not limited to, which buttons were clicked, where a mouse was moved, the text that was entered in a field, that one window was minimized and another was opened, the application associated with a window, etc. In certain embodiments, the data from the listeners may be sent periodically as part of a heartbeat message. In some embodiments, the data may be sent to core hyper-automation system 120 once a predetermined amount of data has been collected, after a predetermined time period has elapsed, or both. One or more servers, such as server 130, receive and store data from the listeners in a database, such as database 140.

Automation processes may execute the logic developed in workflows during design time. In the case of RPA, workflows may include a set of steps, defined herein as "activities," that are executed in a sequence or some other logical flow. Each activity may include an action, such as clicking a button, reading a file, writing to a log panel, etc. In some embodiments, workflows may be nested or embedded.

Long-running workflows for RPA in some embodiments are master projects that support service orchestration, human intervention, and long-running transactions in unattended environments. See, for example, U.S. Pat. No. 10,860,905. Human intervention comes into play when certain processes require human inputs to handle exceptions, approvals, or validation before proceeding to the next step in the activity. In this situation, the process execution is suspended, freeing up the RPA robots until the human task completes.

A long-running workflow may support workflow fragmentation via persistence activities and may be combined with invoke process and non-user interaction activities, orchestrating human tasks with RPA robot tasks. In some embodiments, multiple or many computing systems may participate in executing the logic of a long-running workflow. The long-running workflow may run in a session to facilitate speedy execution. In some embodiments, long-running workflows may orchestrate background processes that may contain activities performing Application Programming Interface (API) calls and running in the long-running workflow session. These activities may be invoked by an invoke process activity in some embodiments. A process with user interaction activities that runs in a user session may be called by starting a job from a conductor activity (conductor described in more detail later herein). The user may interact through tasks that require forms to be completed in the conductor in some embodiments. Activities may be included that cause the RPA robot to wait for a form task to be completed and then resume the long-running workflow.

One or more of automation process(es) 110, 112, 114 is in communication with core hyper-automation system 120. In some embodiments, core hyper-automation system 120 may run a conductor application on one or more servers, such as server 130. While one server 130 is shown for illustration purposes, multiple or many servers that are proximate to one another or in a distributed architecture may be employed without deviating from the scope of the invention. For instance, one or more servers may be provided for conductor functionality, AI/ML model serving, authentication, governance, and/or any other suitable functionality without deviating from the scope of the invention. In some embodiments, core hyper-automation system 120 may incorporate or be part of a public cloud architecture, a private cloud architecture, a hybrid cloud architecture, etc. In certain embodiments, core hyper-automation system 120 may host multiple software-based servers on one or more computing systems, such as server 130. In some embodiments, one or more servers of core hyper-automation system 120, such as server 130, may be implemented via one or more virtual machines (VMs).

In some embodiments, one or more of automation process(es) 110, 112, 114 may call one or more AI/ML models 132 deployed on or accessible by core hyper-automation system 120. AI/ML models 132 may be trained for any suitable purpose without deviating from the scope of the invention, as will be discussed in more detail later herein. Two or more of AI/ML models 132 may be chained in some embodiments (e.g., in series, in parallel, or a combination thereof) such that they collectively provide collaborative output(s). AI/ML models 132 may perform or assist with computer vision (CV), optical character recognition (OCR), document processing and/or understanding, semantic learning and/or analysis, analytical predictions, process discovery, task mining, testing, automatic RPA workflow generation, sequence extraction, clustering detection, audio-to-text translation, any combination thereof, etc. However, any desired number and/or type(s) of AI/ML models may be used without deviating from the scope of the invention. Using multiple AI/ML models may allow the system to develop a global picture of what is happening on a given computing system, for example. For instance, one AI/ML model could perform OCR, another could detect buttons, another could compare sequences, etc. Patterns may be determined individually by an AI/ML model or collectively by multiple AI/ML models. In certain embodiments, one or more AI/ML models are deployed locally on at least one of computing systems 102, 104, 106.

In some embodiments, multiple AI/ML models 132 may be used. Each AI/ML model 132 is an algorithm (or model) that runs on the data, and the AI/ML model itself may be a deep learning neural network (DLNN) of trained artificial "neurons" that are trained on training data, for example. In some embodiments, AI/ML models 132 may have multiple layers that perform various functions, such as statistical modeling (e.g., hidden Markov models (HMMs)), and utilize deep learning techniques (e.g., long short term memory (LSTM) deep learning, encoding of previous hidden states, etc.) to perform the desired functionality.

Hyper-automation system 100 may provide four main groups of functionality in some embodiments: (1) discovery; (2) building automations; (3) management; and (4) engagement. Automations (e.g., run on a user computing system, a server, etc.) may be run by software robots, such as RPA robots, in some embodiments. For instance, attended robots, unattended robots, and/or test robots may be used. Attended robots work with users to assist them with tasks (e.g., via UiPath Assistant™). Unattended robots work independently of users and may run in the background, potentially without user knowledge. Test robots are unattended robots that run test cases against applications or RPA workflows. Test robots may be run on multiple computing systems in parallel in some embodiments.

The discovery functionality may discover and provide automatic recommendations for different opportunities of automations of business processes. Such functionality may be implemented by one or more servers, such as server 130. The discovery functionality may include providing an automation hub, process mining, task mining, and/or task capture in some embodiments. The automation hub (e.g., UiPath Automation Hub™) may provide a mechanism for managing automation rollout with visibility and control. Automation ideas may be crowdsourced from employees via a submission form, for example. Feasibility and return on investment (ROI) calculations for automating these ideas may be provided, documentation for future automations may be collected, and collaboration may be provided to get from automation discovery to build-out faster.

Process mining (e.g., via UiPath Automation Cloud™ and/or UiPath AI Center™) refers to the process of gathering and analyzing the data from applications (e.g., enterprise resource planning (ERP) applications, customer relation management (CRM) applications, email applications, call center applications, etc.) to identify what end-to-end processes exist in an organization and how to automate them effectively, as well as indicate what the impact of the automation will be. This data may be gleaned from user computing systems 102, 104, 106 by listeners, for example, and processed by servers, such as server 130. One or more AI/ML models 132 may be employed for this purpose in some embodiments. This information may be exported to the automation hub to speed up implementation and avoid manual information transfer. The goal of process mining may be to increase business value by automating processes within an organization. Some examples of process mining goals include, but are not limited to, increasing profit, improving customer satisfaction, regulatory and/or contractual compliance, improving employee efficiency, etc.

Task mining (e.g., via UiPath Automation Cloud™ and/or UiPath AI Center™) identifies and aggregates workflows (e.g., employee workflows), and then applies AI to expose patterns and variations in day-to-day tasks, scoring such tasks for ease of automation and potential savings (e.g., time and/or cost savings). One or more AI/ML models 132 may be employed to uncover recurring task patterns in the data. Repetitive tasks that are ripe for automation may then be identified. This information may initially be provided by listeners and analyzed on servers of core hyper-automation system 120, such as server 130, in some embodiments. The findings from task mining (e.g., Extensible Application Markup Language (XAML) process data) may be exported to process documents or to a designer application such as UiPath Studio™ to create and deploy automations more rapidly.

Task mining in some embodiments may include taking screenshots with user actions (e.g., mouse click locations, keyboard inputs, application windows and graphical elements the user was interacting with, timestamps for the interactions, etc.), collecting statistical data (e.g., execution time, number of actions, text entries, etc.), editing and annotating screenshots, specifying types of actions to be recorded, etc.

Task capture (e.g., via UiPath Automation Cloud™ and/or UiPath AI Center™) automatically documents attended processes as users work or provides a framework for unattended processes. Such documentation may include desired tasks to automate in the form of process definition documents (PDDs), skeletal workflows, capturing actions for each part of a process, recording user actions and automatically generating a comprehensive workflow diagram including the details about each step, Microsoft Word® documents, XAML files, and the like. Build-ready workflows may be exported directly to a designer application in some embodiments, such as UiPath Studio™. Task capture may simplify the requirements gathering process for both subject matter experts explaining a process and Center of Excellence (CoE) members providing production-grade automations.

Building automations may be accomplished via a designer application (e.g., UiPath Studio™, UiPath StudioX™, or UiPath Web™). For instance, RPA developers of an RPA development facility 150 may use RPA designer applications 154 of computing systems 152 to build and test automations for various applications and environments, such as web, mobile, SAP®, and virtualized desktops. API integration may be provided for various applications, technologies, and platforms. Predefined activities, drag-and-drop modeling, and a workflow recorder, may make automation easier with minimal coding. Document understanding functionality may be provided via Drag-and-drop AI skills for data extraction and interpretation that call one or more AI/ML models 132. Such automations may process virtually any document type and format, including tables, checkboxes, signatures, and handwriting. When data is validated or exceptions are handled, this information may be used to retrain the respective AI/ML models, improving their accuracy over time.

An integration service may allow developers to seamlessly combine user interface (UI) automation with API automation, for example. Automations may be built that require APIs or traverse both API and non-API applications and systems. A repository (e.g., UiPath Object Repository™) or marketplace (e.g., UiPath Marketplace™) for pre-built RPA and AI templates and solutions may be provided to allow developers to automate a wide variety of processes more quickly. Thus, when building automations, hyper-automation system 100 may provide user interfaces, development environments, API integration, pre-built and/or custom-built AI/ML models, development templates, integrated development environments (IDEs), and advanced AI capabilities. Hyper-automation system 100 enables development, deployment, management, configuration, monitoring, debugging, and maintenance of RPA robots in some embodiments, which may provide automations for hyper-automation system 100.

In some embodiments, components of hyper-automation system 100, such as designer application(s) and/or an external rules engine, provide support for managing and enforcing governance policies for controlling various functionality provided by hyper-automation system 100. Governance is the ability for organizations to put policies in place to prevent users from developing automations (e.g., RPA robots) capable of taking actions that may harm the organization, such as violating the E.U. General Data Protection Regulation (GDPR), the U.S. Health Insurance Portability and Accountability Act (HIPAA), third party application terms of service, etc. Since developers may otherwise create automations that violate privacy laws, terms of service, etc. while performing their automations, some embodiments implement access control and governance restrictions at the robot and/or robot design application level. This may provide an added level of security and compliance into the automation process development pipeline in some embodiments by preventing developers from taking dependencies on unapproved software libraries that may either introduce security risks or work in a way that violates policies, regulations, privacy laws, and/or privacy policies. See, for example, U.S. Nonprovisional patent application Ser. No. 16/924,499 (published as U.S. Patent Application Publication No. 2022/0011732), which is hereby incorporated by reference in its entirety.

The management functionality may provide management, deployment, and optimization of automations across an organization. The management functionality may include orchestration, test management, AI functionality, and/or insights in some embodiments. Management functionality of hyper-automation system 100 may also act as an integration point with third-party solutions and applications for automation applications and/or RPA robots. The management capabilities of hyper-automation system 100 may include, but are not limited to, facilitating provisioning, deployment, configuration, queuing, monitoring, logging, and interconnectivity of RPA robots, among other things.

A conductor application, such as UiPath Orchestrator™ (which may be provided as part of the UiPath Automation Cloud™ in some embodiments, or on premises, in VMs, in a private or public cloud, in a Linux™ VM, or as a cloud native single container suite via UiPath Automation Suite™), provides orchestration capabilities to deploy, monitor, optimize, scale, and ensure security of RPA robot deployments. A test suite (e.g., UiPath Test Suite™) may provide test management to monitor the quality of deployed automations. The test suite may facilitate test planning and execution, meeting of requirements, and defect traceability. The test suite may include comprehensive test reporting.

Analytics software (e.g., UiPath Insights™) may track, measure, and manage the performance of deployed automations. The analytics software may align automation operations with specific key performance indicators (KPIs) and strategic outcomes for an organization. The analytics software may present results in a dashboard format for better understanding by human users.

A data service (e.g., UiPath Data Service™) may be stored in database 140, for example, and bring data into a single, scalable, secure place with a drag-and-drop storage interface. Some embodiments may provide low-code or no-code data modeling and storage to automations while ensuring seamless access, enterprise-grade security, and scalability of the data. AI functionality may be provided by an AI center (e.g., UiPath AI Center™), which facilitates incorporation of AI/ML models into automations. Pre-built AI/ML models, model templates, and various deployment options may make such functionality accessible even to those who are not data scientists. Deployed automations (e.g., RPA robots) may call AI/ML models from the AI center, such as AI/ML models 132. Performance of the AI/ML models may be monitored, and be trained and improved using human-validated data, such as that provided by data review center 160. Human reviewers may provide labeled data to core hyper-automation system 120 via a review application 152 on computing systems 154. For instance, human reviewers may validate that predictions by AI/ML models 132 are accurate or provide corrections otherwise. This dynamic input may then be saved as training data for retraining AI/ML models 132, and may be stored in a database such as database 140, for example. The AI center may then schedule and execute training jobs to train the new versions of the AI/ML models using the training data. Both positive and negative examples may be stored and used for retraining of AI/ML models 132.

The engagement functionality engages humans and automations as one team for seamless collaboration on desired processes. Low-code applications may be built (e.g., via UiPath Apps™) to connect browser tabs and legacy software, even that lacking APIs in some embodiments. Applications may be created quickly using a web browser through a rich library of drag-and-drop controls, for instance. An application can be connected to a single automation or multiple automations.

An action center (e.g., UiPath Action Center™) provides a straightforward and efficient mechanism to hand off processes from automations to humans, and vice versa. Humans may provide approvals or escalations, make exceptions, etc. The automation may then perform the automatic functionality of a given workflow.

A local assistant may be provided as a launchpad for users to launch automations (e.g., UiPath Assistant™). This functionality may be provided in a tray provided by an operating system, for example, and may allow users to interact with RPA robots and RPA robot-powered applications on their computing systems. An interface may list automations approved for a given user and allow the user to run them. These may include ready-to-go automations from an automation marketplace, an internal automation store in an automation hub, etc. When automations run, they may run as a local instance in parallel with other processes on the computing system so users can use the computing system while the automation performs its actions. In certain embodiments, the assistant is integrated with the task capture functionality such that users can document their soon-to-be-automated processes from the assistant launchpad.

Chatbots (e.g., UiPath Chatbots™), social messaging applications, and/or voice commands may enable users to run automations. This may simplify access to information, tools, and resources users need in order to interact with customers or perform other activities. Conversations between people may be readily automated, as with other processes. Trigger RPA robots kicked off in this manner may perform operations such as checking an order status, posting data in a CRM, etc., potentially using plain language commands.

End-to-end measurement and government of an automation program at any scale may be provided by hyper-automation system 100 in some embodiments. Per the above, analytics may be employed to understand the performance of automations (e.g., via UiPath Insights™). Data modeling and analytics using any combination of available business metrics and operational insights may be used for various automated processes. Custom-designed and pre-built dashboards allow data to be visualized across desired metrics, new analytical insights to be discovered, performance indicators to be tracked, ROI to be discovered for automations, telemetry monitoring to be performed on user computing systems, errors and anomalies to be detected, and automations to be debugged. An automation management console (e.g., UiPath Automation Ops™) may be provided to manage automations throughout the automation lifecycle. An organization may govern how automations are built, what users can do with them, and which automations users can access.

Hyper-automation system 100 provides an iterative platform in some embodiments. Processes can be discovered, automations can be built, tested, and deployed, performance may be measured, use of the automations may readily be provided to users, feedback may be obtained, AI/ML models may be trained and retrained, and the process may repeat itself. This facilitates a more robust and effective suite of automations.

Figure 2:
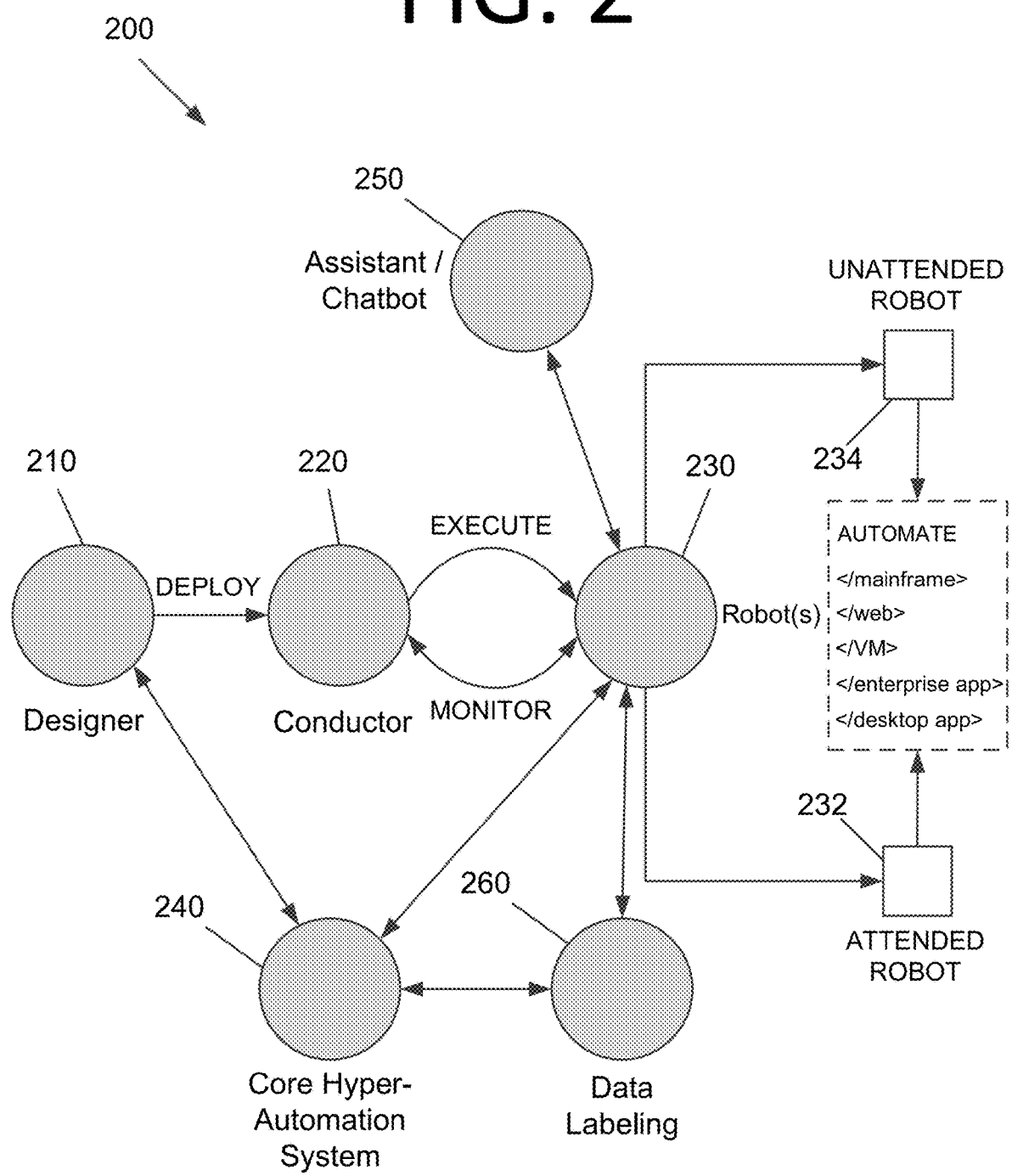
FIG. 2 is an architectural diagram illustrating an RPA system, according to an embodiment of the present invention.

FIG. 2 is an architectural diagram illustrating an RPA system 200, according to an embodiment of the present invention. In some embodiments, RPA system 200 is part of hyper-automation system 100 of FIG. 1. RPA system 200 includes a designer 210 that allows a developer to design and implement workflows. Designer 210 may provide a solution for application integration, as well as automating third-party applications, administrative Information Technology (IT) tasks, and business IT processes. Designer 210 may facilitate development of an automation project, which is a graphical representation of a business process. Simply put, designer 210 facilitates the development and deployment of workflows and robots. In some embodiments, designer 210 may be an application that runs on a user's desktop, an application that runs remotely in a VM, a web application, etc.

The automation project enables automation of rule-based processes by giving the developer control of the execution order and the relationship between a custom set of steps developed in a workflow, defined herein as "activities" per the above. One commercial example of an embodiment of designer 210 is UiPath Studio™. Each activity may include an action, such as clicking a button, reading a file, writing to a log panel, etc. In some embodiments, workflows may be nested or embedded.

Some types of workflows may include, but are not limited to, sequences, flowcharts, Finite State Machines (FSMs), and/or global exception handlers. Sequences may be particularly suitable for linear processes, enabling flow from one activity to another without cluttering a workflow. Flowcharts may be particularly suitable to more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Once a workflow is developed in designer 210, execution of business processes is orchestrated by conductor 220, which orchestrates one or more robots 230 that execute the workflows developed in designer 210. One commercial example of an embodiment of conductor 220 is UiPath Orchestrator™. Conductor 220 facilitates management of the creation, monitoring, and deployment of resources in an environment. Conductor 220 may act as an integration point with third-party solutions and applications. Per the above, in some embodiments, conductor 220 may be part of core hyper-automation system 120 of FIG. 1.

Conductor 220 may manage a fleet of robots 230, connecting and executing robots 230 from a centralized point. Types of robots 230 that may be managed include, but are not limited to, attended robots 232, unattended robots 234, development robots (similar to unattended robots 234, but used for development and testing purposes), and nonproduction robots (similar to attended robots 232, but used for development and testing purposes). Attended robots 232 are triggered by user events and operate alongside a human on the same computing system. Attended robots 232 may be used with conductor 220 for a centralized process deployment and logging medium. Attended robots 232 may help the human user accomplish various tasks, and may be triggered by user events. In some embodiments, processes cannot be started from conductor 220 on this type of robot and/or they cannot run under a locked screen. In certain embodiments, attended robots 232 can only be started from a robot tray or from a command prompt. Attended robots 232 should run under human supervision in some embodiments.

Unattended robots 234 run unattended in virtual environments and can automate many processes. Unattended robots 234 may be responsible for remote execution, monitoring, scheduling, and providing support for work queues. Debugging for all robot types may be run in designer 210 in some embodiments. Both attended and unattended robots may automate various systems and applications including, but not limited to, mainframes, web applications, VMs, enterprise applications (e.g., those produced by SAP®, SalesForce®, Oracle®, etc.), and computing system applications (e.g., desktop and laptop applications, mobile device applications, wearable computer applications, etc.).

Conductor 220 may have various capabilities including, but not limited to, provisioning, deployment, configuration, queueing, monitoring, logging, and/or providing interconnectivity. Provisioning may include creating and maintenance of connections between robots 230 and conductor 220 (e.g., a web application). Deployment may include assuring the correct delivery of package versions to as signed robots 230 for execution. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., a structured query language (SQL) database or a "not only" SQL (NoSQL) database) and/or another storage mechanism (e.g., Elastic Search®, which provides the ability to store and quickly query large datasets). Conductor 220 may provide interconnectivity by acting as the centralized point of communication for third-party solutions and/or applications.

Robots 230 are execution agents that implement workflows built in designer 210. One commercial example of some embodiments of robot(s) 230 is UiPath Robots™. In some embodiments, robots 230 install the Microsoft Windows® Service Control Manager (SCM)-managed service by default. As a result, such robots 230 can open interactive Windows® sessions under the local system account, and have the rights of a Windows® service.

In some embodiments, robots 230 can be installed in a user mode. For such robots 230, this means they have the same rights as the user under which a given robot 230 has been installed. This feature may also be available for High Density (HD) robots, which ensure full utilization of each machine at its maximum potential. In some embodiments, any type of robot 230 may be configured in an HD environment.

Robots 230 in some embodiments are split into several components, each being dedicated to a particular automation task. The robot components in some embodiments include, but are not limited to, SCM-managed robot services, user mode robot services, executors, agents, and command line. SCM-managed robot services manage and monitor Windows® sessions and act as a proxy between conductor 220 and the execution hosts (i.e., the computing systems on which robots 230 are executed). These services are trusted with and manage the credentials for robots 230. A console application is launched by the SCM under the local system.

User mode robot services in some embodiments manage and monitor Windows® sessions and act as a proxy between conductor 220 and the execution hosts. User mode robot services may be trusted with and manage the credentials for robots 230. A Windows® application may automatically be launched if the SCM-managed robot service is not installed.

Executors may run given jobs under a Windows® session (i.e., they may execute workflows. Executors may be aware of per-monitor dots per inch (DPI) settings. Agents may be Windows® Presentation Foundation (WPF) applications that display the available jobs in the system tray window. Agents may be a client of the service. Agents may request to start or stop jobs and change settings. The command line is a client of the service. The command line is a console application that can request to start jobs and waits for their output.

Having components of robots 230 split as explained above helps developers, support users, and computing systems more easily run, identify, and track what each component is executing. Special behaviors may be configured per component this way, such as setting up different firewall rules for the executor and the service. The executor may always be aware of DPI settings per monitor in some embodiments. As a result, workflows may be executed at any DPI, regardless of the configuration of the computing system on which they were created. Projects from designer 210 may also be independent of browser zoom level in some embodiments. For applications that are DPI-unaware or intentionally marked as unaware, DPI may be disabled in some embodiments.

RPA system 200 in this embodiment is part of a hyper-automation system. Developers may use designer 210 to build and test RPA robots that utilize AI/ML models deployed in core hyper-automation system 240 (e.g., as part of an AI center thereof). Such RPA robots may send input for execution of the AI/ML model(s) and receive output therefrom via core hyper-automation system 240.

One or more of robots 230 may be listeners, as described above. These listeners may provide information to core hyper-automation system 240 regarding what users are doing when they use their computing systems. This information may then be used by core hyper-automation system for process mining, task mining, task capture, etc.

An assistant/chatbot 250 may be provided on user computing systems to allow users to launch RPA local robots. The assistant may be located in a system tray, for example. Chatbots may have a user interface so users can see text in the chatbot. Alternatively, chatbots may lack a user interface and run in the background, listening using the computing system's microphone for user speech.

In some embodiments, data labeling may be performed by a user of the computing system on which a robot is executing or on another computing system that the robot provides information to. For instance, if a robot calls an AI/ML model that performs CV on images for VM users, but the AI/ML model does not correctly identify a button on the screen, the user may draw a rectangle around the misidentified or non-identified component and potentially provide text with a correct identification. This information may be provided to core hyper-automation system 240 and then used later for training a new version of the AI/ML model.

Figure 3:
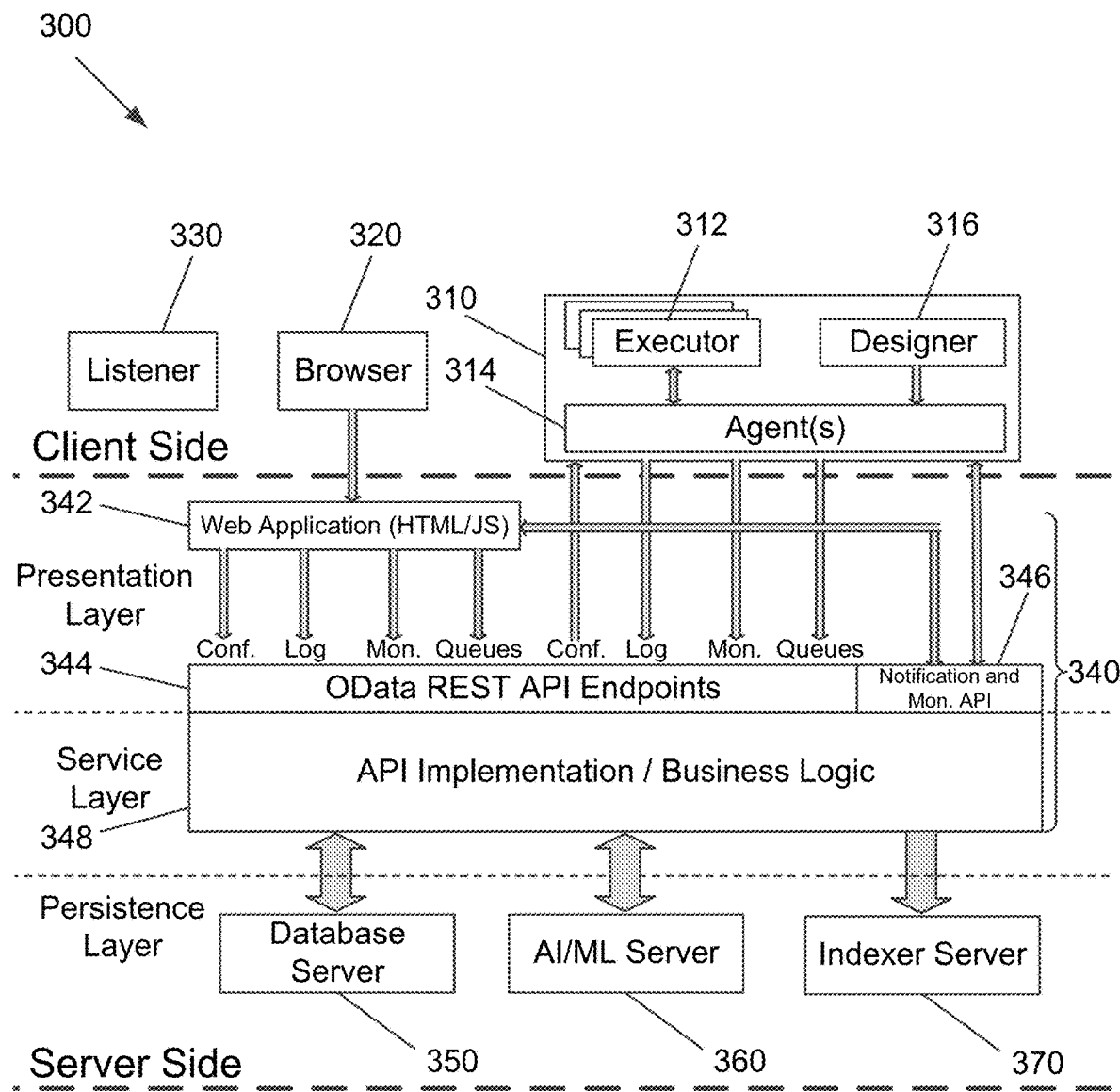
FIG. 3 is an architectural diagram illustrating a deployed RPA system, according to an embodiment of the present invention.

FIG. 3 is an architectural diagram illustrating a deployed RPA system 300, according to an embodiment of the present invention. In some embodiments, RPA system 300 may be a part of RPA system 200 of FIG. 2 and/or hyper-automation system 100 of FIG. 1. Deployed RPA system 300 may be a cloud-based system, an on-premises system, a desktop-based system that offers enterprise level, user level, or device level automation solutions for automation of different computing processes, etc.

It should be noted that the client side, the server side, or both, may include any desired number of computing systems without deviating from the scope of the invention. On the client side, a robot application 310 includes executors 312, an agent 314, and a designer 316. However, in some embodiments, designer 316 may not be running on the same computing system as executors 312 and agent 314. Executors 312 are running processes. Several business projects may run simultaneously, as shown in FIG. 3. Agent 314 (e.g., a Windows® service) is the single point of contact for all executors 312 in this embodiment. All messages in this embodiment are logged into conductor 340, which processes them further via database server 350, an AI/ML server 360, an indexer server 370, or any combination thereof. As discussed above with respect to FIG. 2, executors 312 may be robot components.

In some embodiments, a robot represents an association between a machine name and a username. The robot may manage multiple executors at the same time. On computing systems that support multiple interactive sessions running simultaneously (e.g., Windows® Server 2012), multiple robots may be running at the same time, each in a separate Windows® session using a unique username. This is referred to as HD robots above.

Agent 314 is also responsible for sending the status of the robot (e.g., periodically sending a "heartbeat" message indicating that the robot is still functioning) and downloading the required version of the package to be executed. The communication between agent 314 and conductor 340 is always initiated by agent 314 in some embodiments. In the notification scenario, agent 314 may open a WebSocket channel that is later used by conductor 330 to send commands to the robot (e.g., start, stop, etc.).

A listener 330 monitors and records data pertaining to user interactions with an attended computing system and/or operations of an unattended computing system on which listener 330 resides. Listener 330 may be an RPA robot, part of an operating system, a downloadable application for the respective computing system, or any other software and/or hardware without deviating from the scope of the invention. Indeed, in some embodiments, the logic of the listener is implemented partially or completely via physical hardware.

On the server side, a presentation layer (web application 342, Open Data Protocol (OData) Representative State Transfer (REST) Application Programming Interface (API) endpoints 344, and notification and monitoring 346), a service layer (API implementation/business logic 348), and a persistence layer (database server 350, AI/ML server 360, and indexer server 370) are included. Conductor 340 includes web application 342, OData REST API endpoints 344, notification and monitoring 346, and API implementation/business logic 348. In some embodiments, most actions that a user performs in the interface of conductor 340 (e.g., via browser 320) are performed by calling various APIs. Such actions may include, but are not limited to, starting jobs on robots, adding/removing data in queues, scheduling jobs to run unattended, etc. without deviating from the scope of the invention. Web application 342 is the visual layer of the server platform. In this embodiment, web application 342 uses Hypertext Markup Language (HTML) and JavaScript (JS). However, any desired markup languages, script languages, or any other formats may be used without deviating from the scope of the invention. The user interacts with web pages from web application 342 via browser 320 in this embodiment in order to perform various actions to control conductor 340. For instance, the user may create robot groups, assign packages to the robots, analyze logs per robot and/or per process, start and stop robots, etc.

In addition to web application 342, conductor 340 also includes service layer that exposes OData REST API endpoints 344. However, other endpoints may be included without deviating from the scope of the invention. The REST API is consumed by both web application 342 and agent 314. Agent 314 is the supervisor of one or more robots on the client computer in this embodiment.

The REST API in this embodiment covers configuration, logging, monitoring, and queueing functionality. The configuration endpoints may be used to define and configure application users, permissions, robots, assets, releases, and environments in some embodiments. Logging REST endpoints may be used to log different information, such as errors, explicit messages sent by the robots, and other environment-specific information, for instance. Deployment REST endpoints may be used by the robots to query the package version that should be executed if the start job command is used in conductor 340. Queueing REST endpoints may be responsible for queues and queue item management, such as adding data to a queue, obtaining a transaction from the queue, setting the status of a transaction, etc.

Monitoring REST endpoints may monitor web application 342 and agent 314. Notification and monitoring API 346 may be REST endpoints that are used for registering agent 314, delivering configuration settings to agent 314, and for sending/receiving notifications from the server and agent 314. Notification and monitoring API 346 may also use WebSocket communication in some embodiments.

The APIs in the service layer may be accessed through configuration of an appropriate API access path in some embodiments, e.g., based on whether conductor 340 and an overall hyper-automation system have an on-premises deployment type or a cloud-based deployment type. APIs for conductor 340 may provide custom methods for querying stats about various entities registered in conductor 340. Each logical resource may be an OData entity in some embodiments. In such an entity, components such as the robot, process, queue, etc., may have properties, relationships, and operations. APIs of conductor 340 may be consumed by web application 342 and/or agents 314 in two ways in some embodiments: by getting the API access information from conductor 340, or by registering an external application to use the OAuth flow.

The persistence layer includes a trio of servers in this embodiment—database server 350 (e.g., a SQL server), AI/ML server 360 (e.g., a server providing AI/ML model serving services, such as AI center functionality) and indexer server 370. Database server 350 in this embodiment stores the configurations of the robots, robot groups, associated processes, users, roles, schedules, etc. This information is managed through web application 342 in some embodiments. Database server 350 may manage queues and queue items. In some embodiments, database server 350 may store messages logged by the robots (in addition to or in lieu of indexer server 370). Database server 350 may also store process mining, task mining, and/or task capture-related data, received from listener 330 installed on the client side, for example. While no arrow is shown between listener 330 and database 350, it should be understood that listener 330 is able to communicate with database 350, and vice versa in some embodiments. This data may be stored in the form of PDDs, images, XAML files, etc. Listener 330 may be configured to intercept user actions, processes, tasks, and performance metrics on the respective computing system on which listener 330 resides. For example, listener 330 may record user actions (e.g., clicks, typed characters, locations, applications, active elements, times, etc.) on its respective computing system and then convert these into a suitable format to be provided to and stored in database server 350.

AI/ML server 360 facilitates incorporation of AI/ML models into automations. Pre-built AI/ML models, model templates, and various deployment options may make such functionality accessible even to those who are not data scientists. Deployed automations (e.g., RPA robots) may call AI/ML models from AI/ML server 360. Performance of the AI/ML models may be monitored, and be trained and improved using human-validated data. AI/ML server 360 may schedule and execute training jobs to train new versions of the AI/ML models.

AI/ML server 360 may store data pertaining to AI/ML models and ML packages for configuring various ML skills for a user at development time. An ML skill, as used herein, is a pre-built and trained ML model for a process, which may be used by an automation, for example. AI/ML server 360 may also store data pertaining to document understanding technologies and frameworks, algorithms and software packages for various AI/ML capabilities including, but not limited to, intent analysis, natural language processing (NLP), speech analysis, different types of AI/ML models, etc.

Indexer server 370, which is optional in some embodiments, stores and indexes the information logged by the robots. In certain embodiments, indexer server 370 may be disabled through configuration settings. In some embodiments, indexer server 370 uses ElasticSearch®, which is an open source project full-text search engine. Messages logged by robots (e.g., using activities like log message or write line) may be sent through the logging REST endpoint(s) to indexer server 370, where they are indexed for future utilization.

Figure 4:
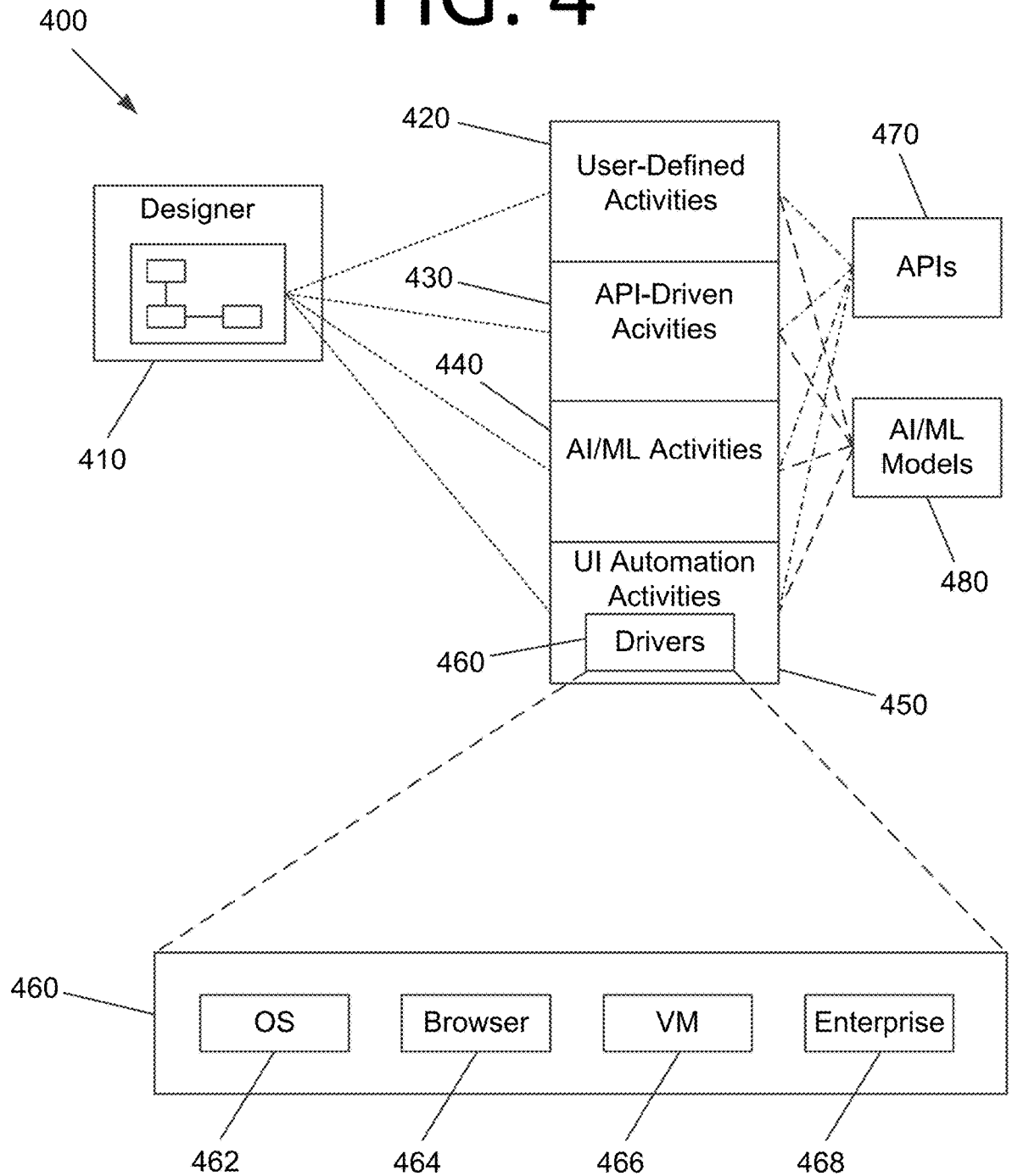
FIG. 4 is an architectural diagram illustrating the relationship between a designer, activities, and drivers, according to an embodiment of the present invention.

FIG. 4 is an architectural diagram illustrating the relationship 400 between a designer 410, activities 420, 430, 440, 450, drivers 460, APIs 470, and AI/ML models 480, according to an embodiment of the present invention. Per the above, a developer uses designer 410 to develop workflows that are executed by robots. The various types of activities may be displayed to the developer in some embodiments. Designer 410 may be local to the user's computing system or remote thereto (e.g., accessed via VM or a local web browser interacting with a remote web server). Workflows may include user-defined activities 420, API-driven activities 430, AI/ML activities 440, and/or UI automation activities 450. User-defined activities 420 and API-driven activities 440 interact with applications via their APIs. User-defined activities 420 and/or AI/ML activities 440 may call one or more AI/ML models 480 in some embodiments, which may be located locally to the computing system on which the robot is operating and/or remotely thereto.

Some embodiments are able to identify non-textual visual components in an image, which is called CV herein. CV may be performed at least in part by AI/ML model(s) 480. Some CV activities pertaining to such components may include, but are not limited to, extracting of text from segmented label data using OCR, fuzzy text matching, cropping of segmented label data using ML, comparison of extracted text in label data with ground truth data, etc. In some embodiments, there may be hundreds or even thousands of activities that may be implemented in user-defined activities 420. However, any number and/or type of activities may be used without deviating from the scope of the invention.

UI automation activities 450 are a subset of special, lower-level activities that are written in lower-level code and facilitate interactions with the screen. UI automation activities 450 facilitate these interactions via drivers 460 that allow the robot to interact with the desired software. For instance, drivers 460 may include operating system (OS) drivers 462, browser drivers 464, VM drivers 466, enterprise application drivers 468, etc. One or more of AI/ML models 480 may be used by UI automation activities 450 in order to perform interactions with the computing system in some embodiments. In certain embodiments, AI/ML models 480 may augment drivers 460 or replace them completely. Indeed, in certain embodiments, drivers 460 are not included.

Drivers 460 may interact with the OS at a low level looking for hooks, monitoring for keys, etc. via OS drivers 462. Drivers 460 may facilitate integration with Chrome®, IE®, Citrix®, SAP®, etc. For instance, the "click" activity performs the same role in these different applications via drivers 460.

Figure 5:
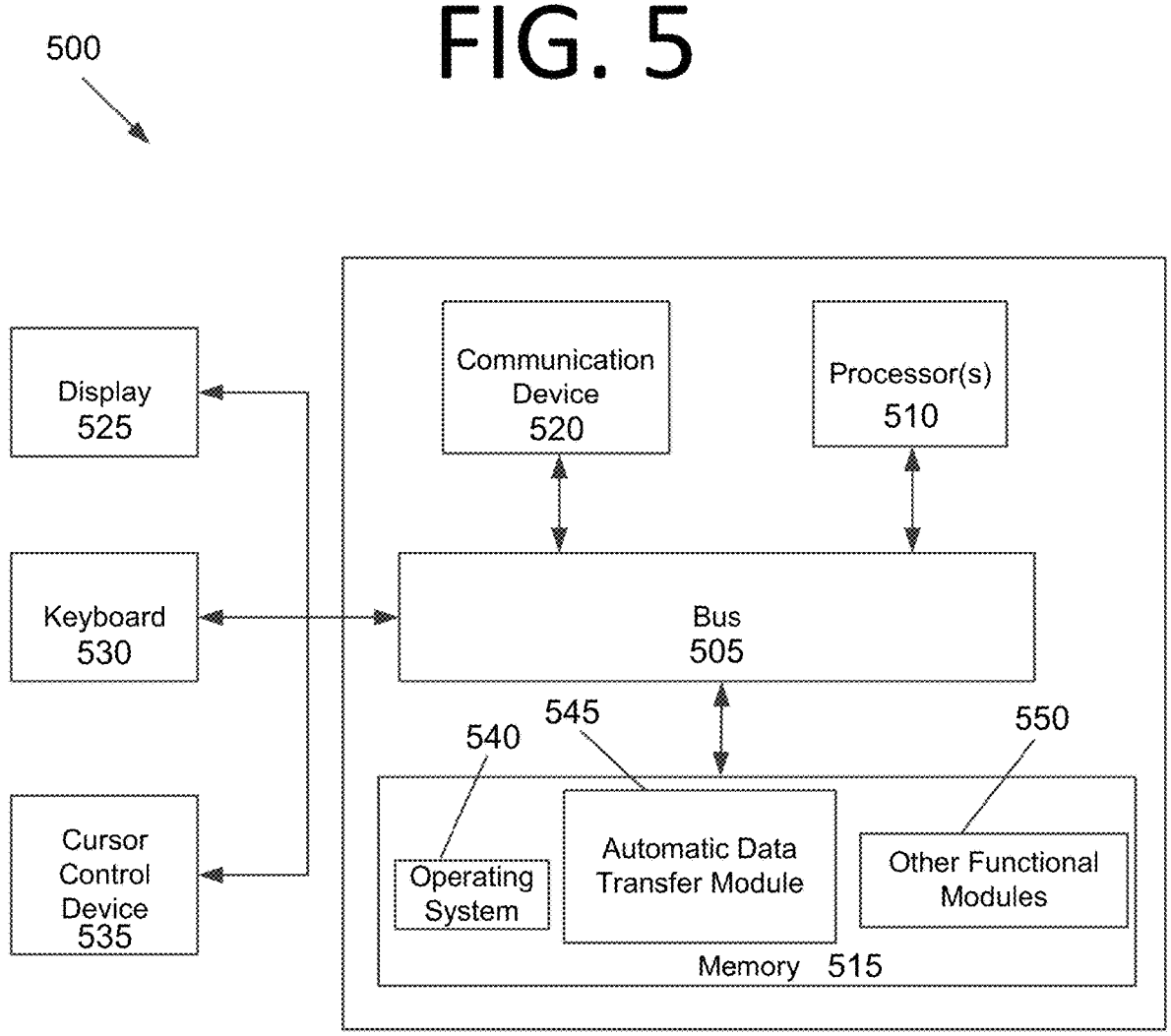
FIG. 5 is an architectural diagram illustrating a computing system configured to perform automatic data transfer between a source and a target using semantic AI for RPA, according to an embodiment of the present invention.

FIG. 5 is an architectural diagram illustrating a computing system 500 configured to perform automatic data transfer between a source and a target using semantic AI for RPA, according to an embodiment of the present invention. In some embodiments, computing system 500 may be one or more of the computing systems depicted and/or described herein. In certain embodiments, computing system 500 may be part of a hyper-automation system, such as that shown in FIGS. 1 and 2. Computing system 500 includes a bus 505 or other communication mechanism for communicating information, and processor(s) 510 coupled to bus 505 for processing information. Processor(s) 510 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 510 may also have multiple processing cores, and at least some of the cores may be configured to perform specific functions. Multi-parallel processing may be used in some embodiments. In certain embodiments, at least one of processor(s) 510 may be a neuromorphic circuit that includes processing elements that mimic biological neurons. In some embodiments, neuromorphic circuits may not require the typical components of a Von Neumann computing architecture.

Computing system 500 further includes a memory 515 for storing information and instructions to be executed by processor(s) 510. Memory 515 can be comprised of any combination of random access memory (RAM), read-only memory (ROM), flash memory, cache, static storage such as a magnetic or optical disk, or any other types of non-transitory computer-readable media or combinations thereof. Non-transitory computer-readable media may be any available media that can be accessed by processor(s) 510 and may include volatile media, non-volatile media, or both. The media may also be removable, non-removable, or both.

Computing system 500 includes a communication device 520, such as a transceiver, to provide access to a communications network via a wireless and/or wired connection. In some embodiments, communication device 520 may include one or more antennas that are singular, arrayed, phased, switched, beamforming, beamsteering, a combination thereof, and or any other antenna configuration without deviating from the scope of the invention. Processor(s) 510 are further coupled via bus 505 to a display 525. Any suitable display device and haptic I/O may be used without deviating from the scope of the invention.

A keyboard 530 and a cursor control device 535, such as a computer mouse, a touchpad, etc., are further coupled to bus 505 to enable a user to interface with computing system 500. However, in certain embodiments, a physical keyboard and mouse may not be present, and the user may interact with the device solely through display 525 and/or a touchpad (not shown). Any type and combination of input devices may be used as a matter of design choice. In certain embodiments, no physical input device and/or display is present. For instance, the user may interact with computing system 500 remotely via another computing system in communication therewith, or computing system 500 may operate autonomously.

Memory 515 stores software modules that provide functionality when executed by processor(s) 510. The modules include an operating system 540 for computing system 500. The modules further include an automatic data transfer module 545 that is configured to perform all or part of the processes described herein or derivatives thereof. Computing system 500 may include one or more additional functional modules 550 that include additional functionality.

One skilled in the art will appreciate that a "computing system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems. The computing system could be part of or otherwise accessible by a local area network (LAN), a mobile communications network, a satellite communications network, the Internet, a public or private cloud, a hybrid cloud, a server farm, any combination thereof, etc. Any localized or distributed architecture may be used without deviating from the scope of the invention.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 6A:
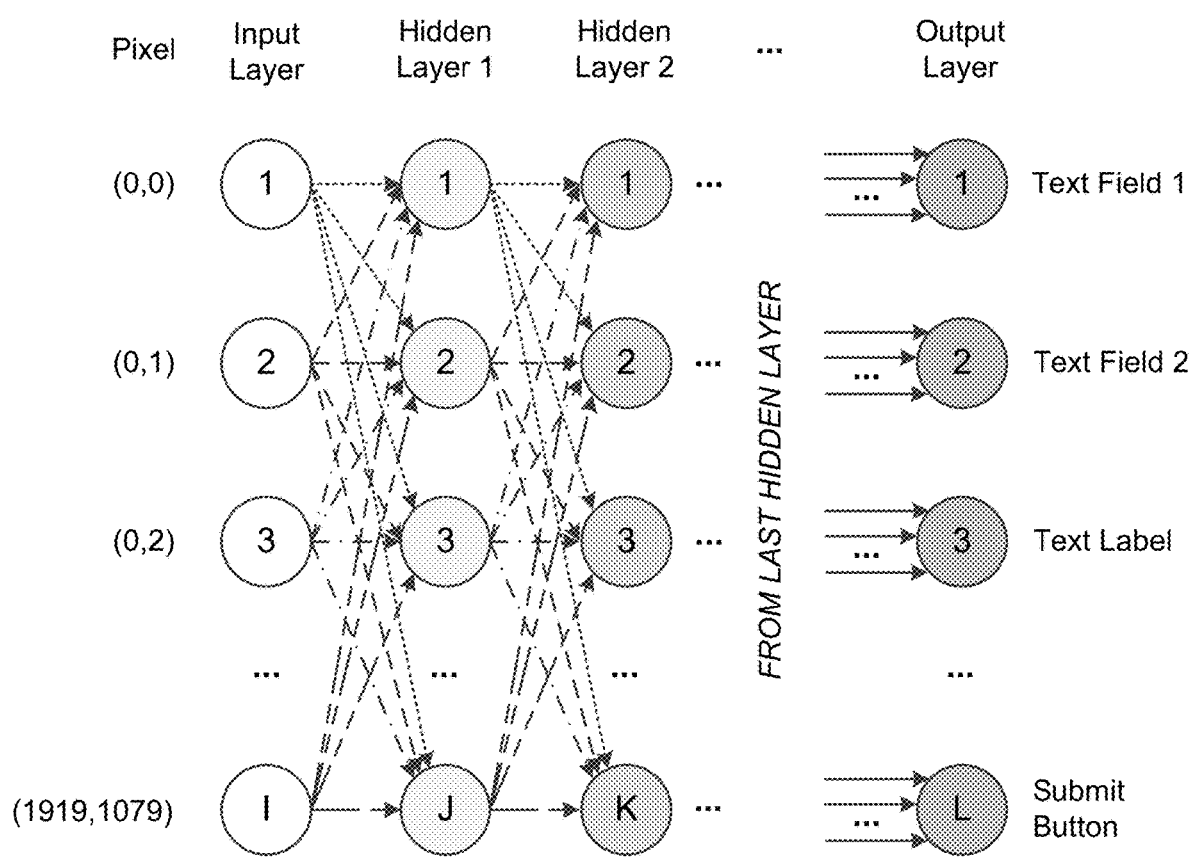
FIG. 6A illustrates an example of a neural network that has been trained to recognize graphical elements in an image, according to an embodiment of the present invention.

Various types of AI/ML models may be trained and deployed without deviating from the scope of the invention. For instance, FIG. 6A illustrates an example of a neural network 600 that has been trained to recognize graphical elements in an image, according to an embodiment of the present invention. Here, neural network 600 receives pixels of a screenshot image of a 1920×1080 screen as input for input "neurons" 1 to I of the input layer. In this case, I is 2,073,600, which is the total number of pixels in the screenshot image.

Neural network 600 also includes a number of hidden layers. Both DLNNs and shallow learning neural networks (SLNNs) usually have multiple layers, although SLNNs may only have one or two layers in some cases, and normally fewer than DLNNs. Typically, the neural network architecture includes an input layer, multiple intermediate layers, and an output layer, as is the case in neural network 600.

A DLNN often has many layers (e.g., 10, 50, 200, etc.) and subsequent layers typically reuse features from previous layers to compute more complex, general functions. A SLNN, on the other hand, tends to have only a few layers and train relatively quickly since expert features are created from raw data samples in advance. However, feature extraction is laborious. DLNNs, on the other hand, usually do not require expert features, but tend to take longer to train and have more layers.

For both approaches, the layers are trained simultaneously on the training set, normally checking for overfitting on an isolated cross-validation set. Both techniques can yield excellent results, and there is considerable enthusiasm for both approaches. The optimal size, shape, and quantity of individual layers varies depending on the problem that is addressed by the respective neural network.

Returning to FIG. 6A, pixels provided as the input layer are fed as inputs to the J neurons of hidden layer 1. While all pixels are fed to each neuron in this example, various architectures are possible that may be used individually or in combination including, but not limited to, feed forward networks, radial basis networks, deep feed forward networks, deep convolutional inverse graphics networks, convolutional neural networks, recurrent neural networks, artificial neural networks, long/short term memory networks, gated recurrent unit networks, generative adversarial networks, liquid state machines, auto encoders, variational auto encoders, denoising auto encoders, sparse auto encoders, extreme learning machines, echo state networks, Markov chains, Hopfield networks, Boltzmann machines, restricted Boltzmann machines, deep residual networks, Kohonen networks, deep belief networks, deep convolutional networks, support vector machines, neural Turing machines, or any other suitable type or combination of neural networks without deviating from the scope of the invention.

Hidden layer 2 receives inputs from hidden layer 1, hidden layer 3 receives inputs from hidden layer 2, and so on for all hidden layers until the last hidden layer provides its outputs as inputs for the output layer. It should be noted that numbers of neurons I, J, K, and L are not necessarily equal, and thus, any desired number of layers may be used for a given layer of neural network 600 without deviating from the scope of the invention. Indeed, in certain embodiments, the types of neurons in a given layer may not all be the same.

Neural network 600 is trained to assign a confidence score to graphical elements believed to have been found in the image. In order to reduce matches with unacceptably low likelihoods, only those results with a confidence score that meets or exceeds a confidence threshold may be provided in some embodiments. For instance, if the confidence threshold is 80%, outputs with confidence scores exceeding this amount may be used and the rest may be ignored. In this case, the output layer indicates that two text fields, a text label, and a submit button were found. Neural network 600 may provide the locations, dimensions, images, and/or confidence scores for these elements without deviating from the scope of the invention, which can be used subsequently by an RPA robot or another process that uses this output for a given purpose.

It should be noted that neural networks are probabilistic constructs that typically have a confidence score. This may be a score learned by the AI/ML model based on how often a similar input was correctly identified during training. For instance, text fields often have a rectangular shape and a white background. The neural network may learn to identify graphical elements with these characteristics with a high confidence. Some common types of confidence scores include a decimal number between 0 and 1 (which can be interpreted as a percentage of confidence), a number between negative co and positive co, or a set of expressions (e.g., "low," "medium," and "high"). Various post-processing calibration techniques may also be employed in an attempt to obtain a more accurate confidence score, such as temperature scaling, batch normalization, weight decay, negative log likelihood (NLL), etc.

"Neurons" in a neural network are mathematical functions that are typically based on the functioning of a biological neuron. Neurons receive weighted input and have a summation and an activation function that governs whether they pass output to the next layer. This activation function may be a nonlinear thresholded activity function where nothing happens if the value is below a threshold, but then the function linearly responds above the threshold (i.e., a rectified linear unit (ReLU) nonlinearity). Summation functions and ReLU functions are used in deep learning since real neurons can have approximately similar activity functions. Via linear transforms, information can be subtracted, added, etc. In essence, neurons act as gating functions that pass output to the next layer as governed by their underlying mathematical function. In some embodiments, different functions may be used for at least some neurons.

Figure 6B:
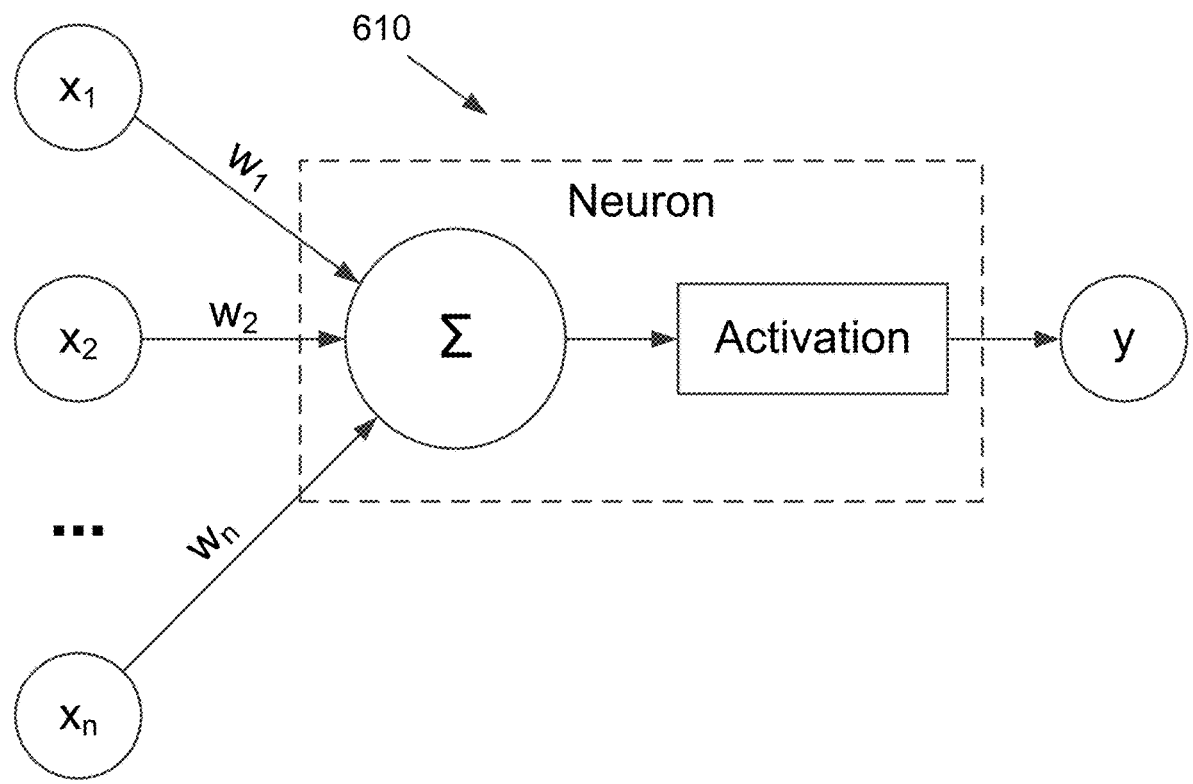
FIG. 6B illustrates an example of a neuron, according to an embodiment of the present invention.

An example of a neuron 610 is shown in FIG. 6B. Inputs $x_1, x_2, \ldots, x_n$ from a preceding layer are assigned respective weights $w_1, w_2, \ldots, w_n$. Thus, the collective input from preceding neuron 1 is $w_1 x_1$. These weighted inputs are used for the neuron's summation function modified by a bias, such as:

$$\sum_{i=1}^{m}(w_i x_i) + \text{bias} \tag{1}$$

This summation is compared against an activation function $f(x)$ to determine whether the neuron "fires". For instance, $f(x)$ may be given by:

$$f(x) = \begin{cases} 1 & \text{if } \sum wx + \text{bias} \geq 0 \\ 0 & \text{if } \sum wx + \text{bias} < 0 \end{cases} \tag{2}$$

The output y of neuron 710 may thus be given by:

$$y = f(x) \sum_{i=1}^{m}(w_i x_i) + \text{bias} \tag{3}$$

In this case, neuron 610 is a single-layer perceptron. However, any suitable neuron type or combination of neuron types may be used without deviating from the scope of the invention. It should also be noted that the ranges of values of the weights and/or the output value(s) of the activation function may differ in some embodiments without deviating from the scope of the invention.

The goal, or "reward function" is often employed, such as for this case the successful identification of graphical elements in the image. A reward function explores intermediate transitions and steps with both short-term and long-term rewards to guide the search of a state space and attempt to achieve a goal (e.g., successful identification of graphical elements, successful identification of a next sequence of activities for an RPA workflow, etc.).

During training, various labeled data (in this case, images) are fed through neural network 600. Successful identifications strengthen weights for inputs to neurons, whereas unsuccessful identifications weaken them. A cost function, such as mean square error (MSE) or gradient descent may be used to punish predictions that are slightly wrong much less than predictions that are very wrong. If the performance of the AI/ML model is not improving after a certain number of training iterations, a data scientist may modify the reward function, provide indications of where non-identified graphical elements are, provide corrections of misidentified graphical elements, etc.

Backpropagation is a technique for optimizing synaptic weights in a feedforward neural network. Backpropagation may be used to "pop the hood" on the hidden layers of the neural network to see how much of the loss every node is responsible for, and subsequently updating the weights in such a way that minimizes the loss by giving the nodes with higher error rates lower weights, and vice versa. In other words, backpropagation allows data scientists to repeatedly adjust the weights so as to minimize the difference between actual output and desired output.

The backpropagation algorithm is mathematically founded in optimization theory. In supervised learning, training data with a known output is passed through the neural network and error is computed with a cost function from known target output, which gives the error for backpropagation. Error is computed at the output, and this error is transformed into corrections for network weights that will minimize the error.

In the case of supervised learning, an example of backpropagation is provided below. A column vector input x is processed through a series of N nonlinear activity functions $f_i$ between each layer i=1, . . . , N of the network, with the output at a given layer first multiplied by a synaptic matrix $W_i$, and with a bias vector $b_i$ added. The network output o, given by $$o = f_N(W_N f_{N-1}(W_{N-1} f_{N-2}( \ldots f_1(W_1 x + b_1) \ldots ) + b_{N-1}) + b_N) \quad (4)$$

In some embodiments, o is compared with a target output t, resulting in an error $$E = \frac{1}{21} \|o - t\|^2,$$

which is desired to be minimized.

Optimization in the form of a gradient descent procedure may be used to minimize the error by modifying the synaptic weights $W_i$ for each layer. The gradient descent procedure requires the computation of the output o given an input x corresponding to a known target output t, and producing an error o−t. This global error is then propagated backwards giving local errors for weight updates with computations similar to, but not exactly the same as, those used for forward propagation. In particular, the backpropagation step typically requires an activity function of the form $p_j(n_j) = f_j'(n_j)$, where $n_j$ is the network activity at layer j (i.e., $n_j = W_j o_{j-1} + b_j$) where $o_j = f_j(n_j)$ and the apostrophe ' denotes the derivative of the activity function $f$.

The weight updates may be computed via the formulae:

$$d_j = \begin{cases} (o-t) \circ p_j(n_j), & j = N \\ W_{j+1}^T d_{j+1} \circ p_j(n_j), & j < N \end{cases} \quad (5)$$

$$\frac{\partial E}{\partial W_{j+1}} = d_{j+1}(o_j)^T \quad (6)$$

$$\frac{\partial E}{\partial b_{j+1}} = d_{j+1} \quad (7)$$

$$W_j^{new} = W_j^{old} - \eta \frac{\partial E}{\partial W_j} \quad (8)$$

where ∘ denotes a Hadamard product (i.e., the element-wise product of two vectors), $T$ denotes the matrix transpose, and $o_j$ denotes $f_j(W_j o_{j-1} + b_j)$, with $o_0 = x$. Here, the learning rate η is chosen with respect to machine learning considerations. Below, η is related to the neural Hebbian learning mechanism used in the neural implementation. Note that the synapses W and b can be combined into one large synaptic matrix, where it is assumed that the input vector has appended ones, and extra columns representing the b synapses are subsumed to W.

The AI/ML model may be trained over multiple epochs until it reaches a good level of accuracy (e.g., 97% or better using an F2 or F4 threshold for detection and approximately 2,000 epochs). This accuracy level may be determined in some embodiments using an F1 score, an F2 score, an F4 score, or any other suitable technique without deviating from the scope of the invention. Once trained on the training data, the AI/ML model may be tested on a set of evaluation data that the AI/ML model has not encountered before. This helps to ensure that the AI/ML model is not "over fit" such that it identifies graphical elements in the training data well, but does not generalize well to other images.

In some embodiments, it may not be known what accuracy level is possible for the AI/ML model to achieve. Accordingly, if the accuracy of the AI/ML model is starting to drop when analyzing the evaluation data (i.e., the model is performing well on the training data, but is starting to perform less well on the evaluation data), the AI/ML model may go through more epochs of training on the training data (and/or new training data). In some embodiments, the AI/ML model is only deployed if the accuracy reaches a certain level or if the accuracy of the trained AI/ML model is superior to an existing deployed AI/ML model.

In certain embodiments, a collection of trained AI/ML models may be used to accomplish a task, such as employing an AI/ML model for each type of graphical element of interest, employing an AI/ML model to perform OCR, deploying yet another AI/ML model to recognize proximity relationships between graphical elements, employing still another AI/ML model to generate an RPA workflow based on the outputs from the other AI/ML models, etc. This may collectively allow the AI/ML models to enable semantic automation, for instance.

Some embodiments may use transformer networks such as SentenceTransformers™, which is a Python™ framework for state-of-the-art sentence, text, and image embeddings. Such transformer networks learn associations of words and phrases that have both high scores and low scores. This trains the AI/ML model to determine what is close to the input and what is not, respectively. Rather than just using pairs of words/phrases, transformer networks may use the field length and field type, as well.

Figure 7:
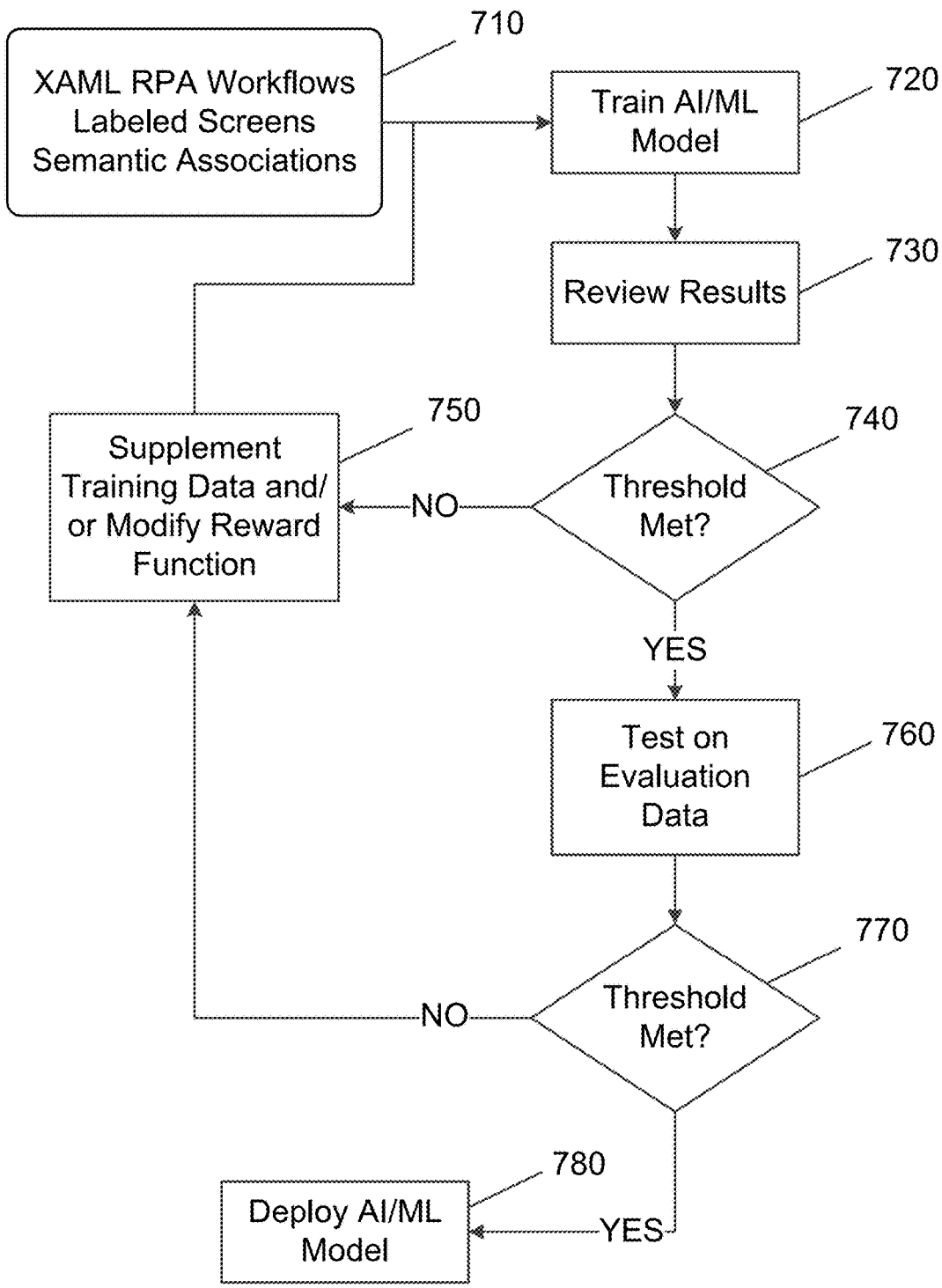
FIG. 7 is a flowchart illustrating a process for training AI/ML model(s), according to an embodiment of the present invention.
Figure 8A:
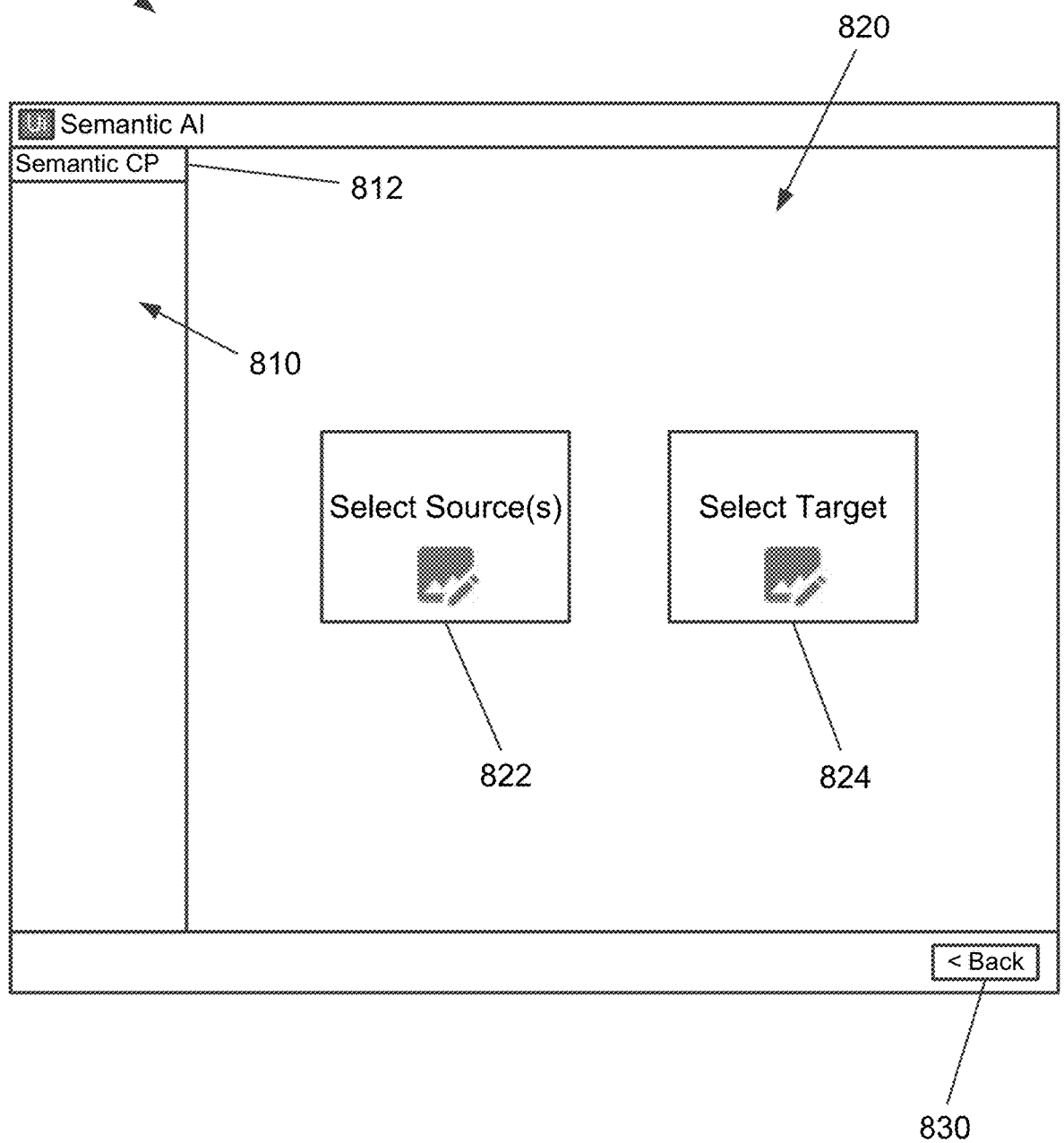
Figure 8C:
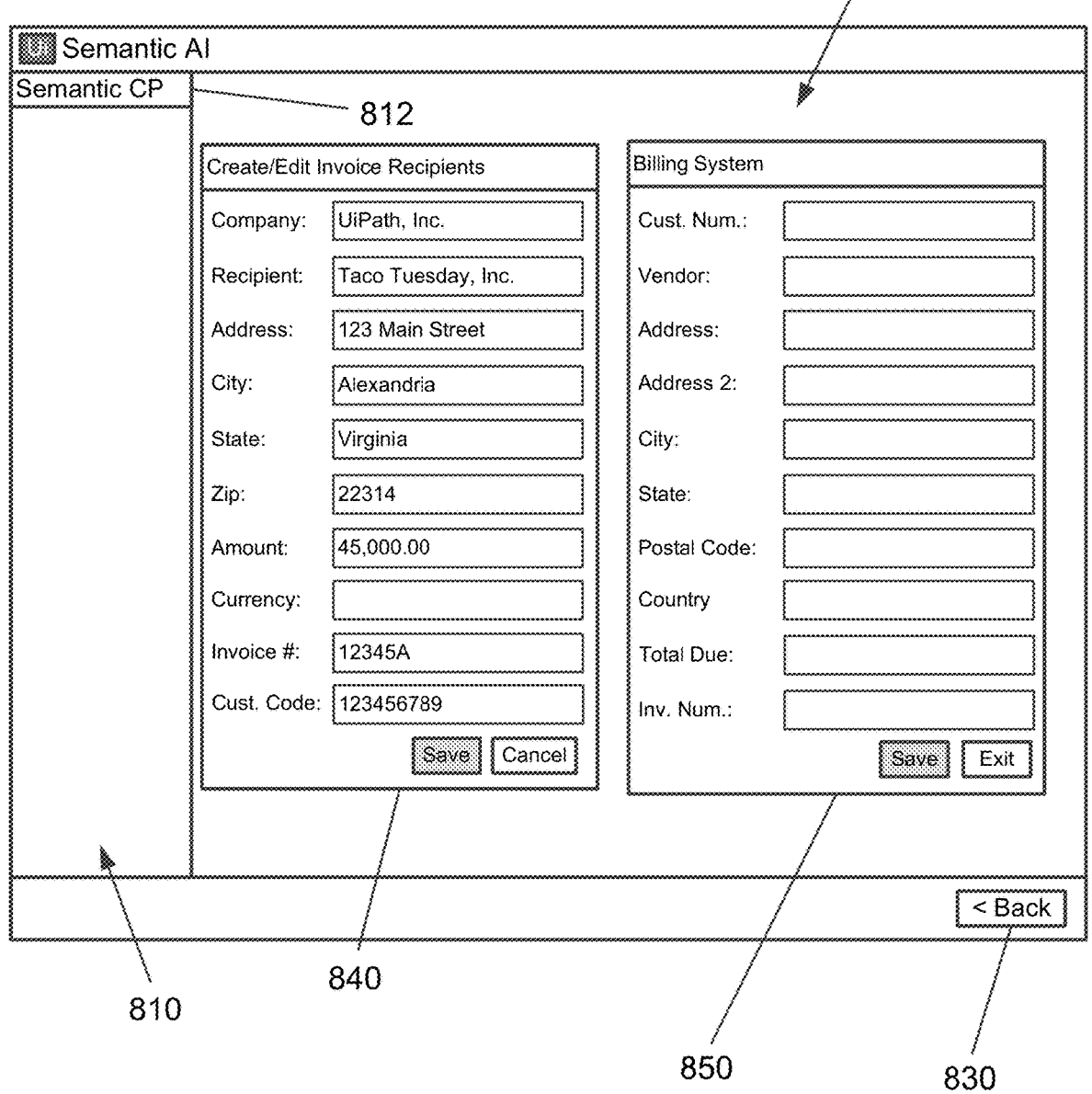
Figure 8D:
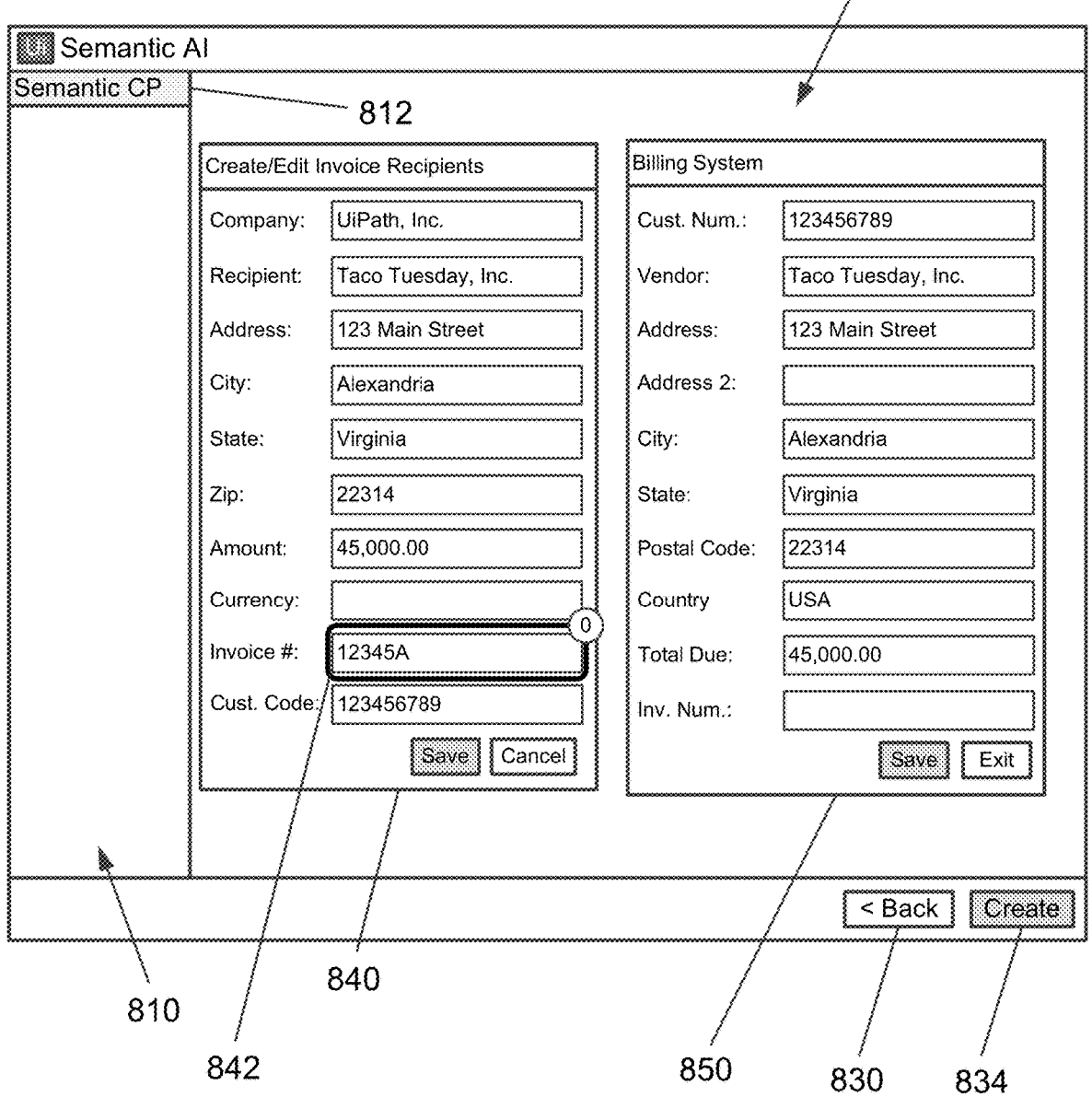

FIG. 7 is a flowchart illustrating a process 700 for training AI/ML model(s), according to an embodiment of the present invention. The process begins with providing training data, for instance, labeled data as shown in FIG. 7, such as labeled screens (e.g., with graphical elements and text identified), words and phrases, a "thesaurus" of semantic associations between words and phrases such that similar words and phrases for a given word or phrase can be identified, etc. at 710. The nature of the training data that is provided will depend on the objective that the AI/ML model is intended to achieve. The AI/ML model is then trained over multiple epochs at 720 and results are reviewed at 730.

If the AI/ML model fails to meet a desired confidence threshold at 740, the training data is supplemented and/or the reward function is modified to help the AI/ML model achieve its objectives better at 750 and the process returns to step 720. If the AI/ML model meets the confidence threshold at 740, the AI/ML model is tested on evaluation data at 760 to ensure that the AI/ML model generalizes well and that the AI/ML model is not over fit with respect to the training data. The evaluation data may include screens, source data, etc. that the AI/ML model has not processed before. If the confidence threshold is met at 770 for the evaluation data, the AI/ML model is deployed at 780. If not, the process returns to step 750 and the AI/ML model is trained further.

Some embodiments bring semantic automation into automation platforms for creating fully automated workflows with less or minimal interaction input from the developer. Using semantic mapping, the UI fields from a data source/source screen are mapped to UI fields on the target screen semantically using one or more AI/ML models, and fully automated workflows can be created from this semantic mapping without intervention by the developer. In a current prototype, the mapping can be achieved for up to 80% of the UI fields, and with developer assistance, the remaining ~20% can be mapped. The AI/ML model(s) can be retrained to learn to match the UI fields more accurately over time, with the expectation that the mapping will approach 100% accuracy in the future.

In some embodiments, the RPA designer application includes a semantic matching feature that allows RPA developers to perform a match between two screens or between data (e.g., customer data) and a screen. Upon selection of semantic AI functionality, the RPA designer application may display a matching interface, such as matching interface 800 of FIGS. 8A-D. While this is a general example, many use cases exist for the semantic AI provided by embodiments of the present invention, such as mapping an invoice to SAP®, automatically inputting data from an excel spreadsheet into a CRM application, mapping XAML from an RPA workflow to another RPA workflow, etc. Also, while this example consists of text fields, other graphical elements, such as buttons, text areas, data without a visual display, etc. may be mapped without deviating from the scope of the invention.

Matching interface 800 includes a mapping options pane 810 and a mapping pane 820. When the developer (including citizen developers with little or no programming experience) chooses select source(s) 822 or select target 824, the user can select the source of the data and the target to which the source data will be copied, respectively. It is possible that multiple sources may be used, and the data therefrom can be stored (e.g., collected in a single data storage object) for matching with the target. This source information is then used for filling in the target. Select source(s) button 822 allows the user to designate multiple sources in this embodiment. These sources may be learned by capturing the user's source selection and future copy-and-paste operations for that application may employ these sources automatically, or offer the technique to the user as an option.

In some embodiments, the user may select the system clipboard as a source via select source(s) button 822. When a user adds information to the system clipboard (e.g., when a user presses CTRL+C and copies selected content in Microsoft Windows®), this information may include data that the user would like to enter into the target in some embodiments. This information can be obtained by a suitable operating system API, such as via System.Windows.Forms.dll using Clipboard.GetText( ) for Windows®. Semantic mapping can then be performed from the clipboard to the target. If the clipboard content is copied text, such as a sentence, paragraph, etc., NLP may be applied to this information to obtain content for semantic matching with the target.

In some embodiments, when the user chooses select source 822 or select target 824, a type selection interface 860 is shown. In FIG. 8B, after the user chooses select source 822, type selection interface 860 provides a dropdown 862 listing various types that are recognized and supported by the RPA designer application. The user can then click confirm button 864 to confirm the type if one of the types pertains to the source or target. Based on this selection, the RPA designer application may be able to determine with more certainty what the labels and fields are in the source and/or the target.

Once selected, if they have visible interfaces, source screen 840 and target screen 850 are shown. See FIG. 8C. However, in some embodiments, this step may be skipped, or potentially, no display for these screens is provided to the user.

When the user presses "Semantic CP" button 812 to perform a semantic copy-and-paste, the semantic matching AI/ML model is called to match source labels and values with target labels and fields. The values for matched fields are then automatically copied from the source to the target. See FIG. 8D. However, in this case, "Invoice #" in the source was not mapped to "Inv. Num." in the target and has a confidence score of 0. Accordingly, the field 842 in the source that was not matched is highlighted 842. The developer can then manually map the labels/fields in the source and target that match, and this mapping can be saved for retraining of the semantic matching AI/ML model. For instance, the source and target screens may be saved, along with bounding box information (e.g., coordinates) and the coordinates and text of labels associated with the matched fields in source screen 840 and target screen 850.

Relationships between labels in the source screen and target screen may be used to determine what a given text field is meant to represent, although the text fields may be similar to or the same as one another. This may be accomplished by assigning one or more anchors to a given text field. For instance, because the field "City" appears directly to the left of its associated text field in target screen 850 and no other text field includes this label, the designer application and/or semantic matching AI/ML model(s) may determine that these fields are linked, and assign the City label as an anchor for the target text field. If the label does not uniquely identify the text field, one or more other graphical elements may be assigned as anchors, and their geometric relationships may be used to uniquely identify the given target element. See, for example, U.S. Pat. Nos. 10,936,351 and 11,200,073.

After the source screen or source data and the target screen have been mapped, the user can click Create button 834 to automatically generate one or more activities in the RPA workflow that implement the desired mapping. This causes the RPA workflow activities to be automatically created. In some embodiments, the RPA workflow is immediately executed to perform the mapping task desired by the user after creation.

To automatically create the RPA workflow, the designer application may make use of a UI object repository. See, for example, U.S. Patent Application Publication No. 2022/0012024. A UI object repository (e.g., the UiPath Object Repository™) is a collection of UI object libraries, which are themselves collections of UI descriptors (e.g., for a certain version of an application and one or more screens thereof). Unified target controls for similar graphical elements can be obtained from the UI object repository, which instructs the RPA robot how to interact with a given graphical element.

Figure 9:
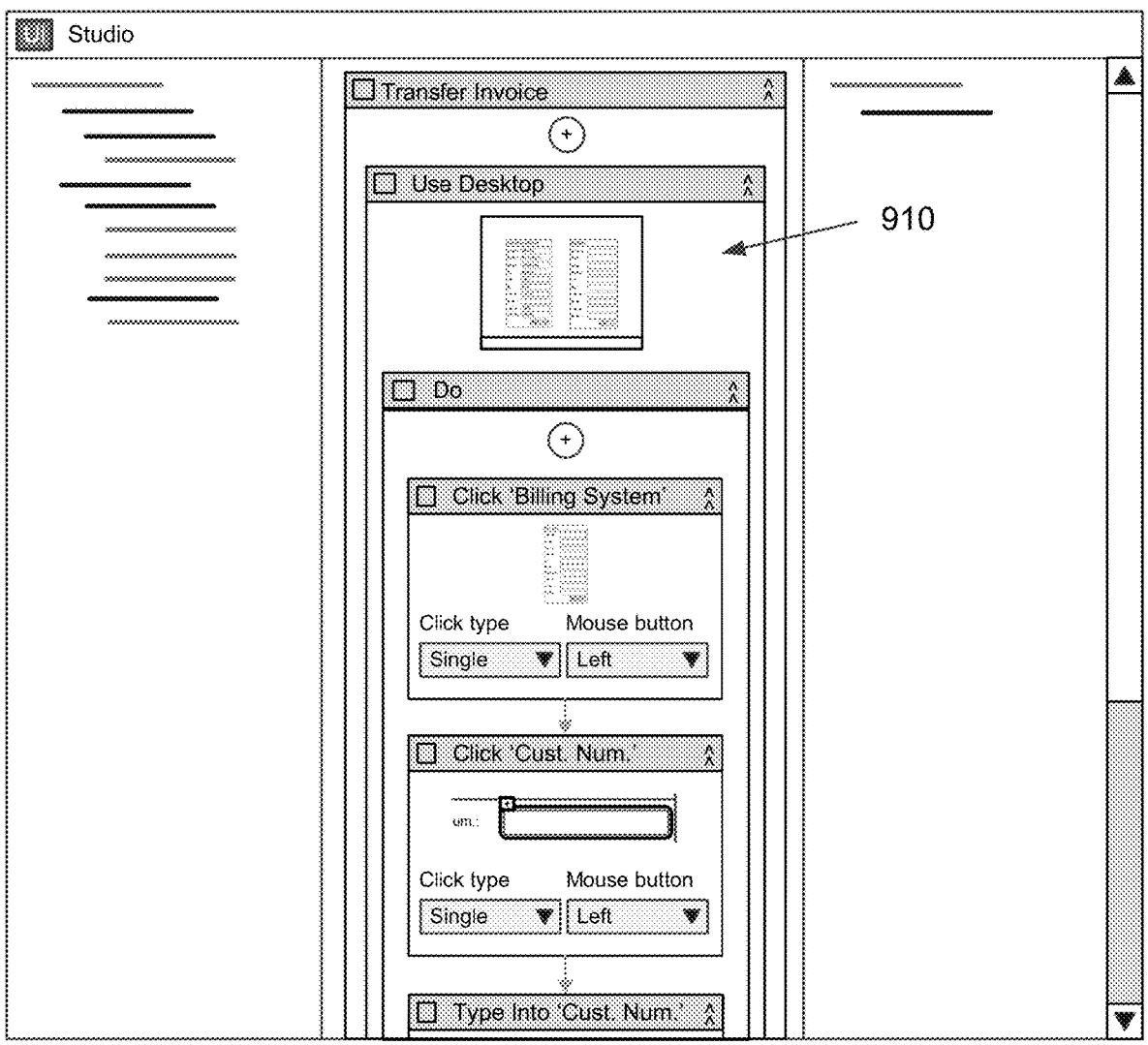
FIG. 9 illustrates an RPA designer application with an automatically generated RPA workflow, according to an embodiment of the present invention.

Such an example is shown in FIG. 9, which illustrates an RPA designer application 900 with automatically generated activities in an RPA workflow 910, according to an embodiment of the present invention. The semantic matching AI/ML model(s) have been trained to recognize associations between the source screen or source data and the target screen, per the above. In the case of the example of FIGS. 8A-C and 9, the semantic matching AI/ML model(s) are able to determine that data from fields in the source screen or source data should be copied into the matching fields in the target screen. Accordingly, RPA designer application 900 knows to obtain UI descriptors for the target elements from the UI object repository, add activities to RPA workflow 910 that click on the target screen, click on each target field, and enter the text from the source screen or data source into the respective matching fields in the target screen using these UI descriptors. RPA designer application 900 automatically generates one or more activities in RPA workflow 910 that implement this functionality. In some embodiments, the developer may not be permitted to modify these activities. However, in certain embodiments, the developer may be able to modify configurations for the activities, have full permissions for editing the activities, etc. In some embodiments, the RPA designer application automatically generates an RPA robot implementing the RPA workflow and executes the RPA robot so information from the source screen or source data is automatically copied into the target screen without further direction from the developer.

Figure 10A:
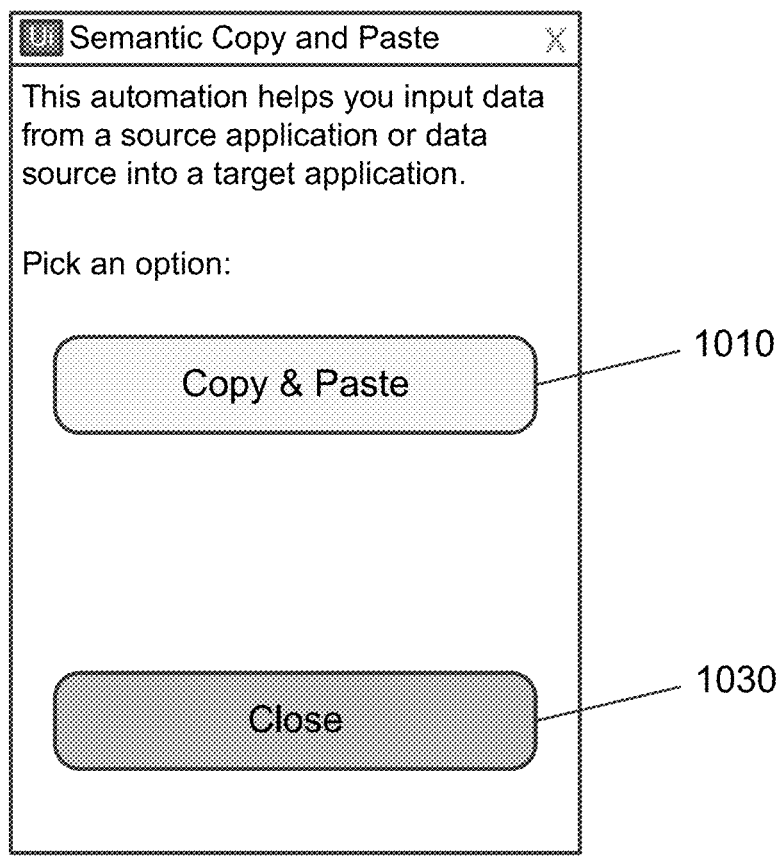

Some embodiments provide a semantic copy and paste feature that allows users at runtime without substantial programming experience to perform semantic automation. FIG. 10A illustrates a semantic copy and paste interface 1000, according to an embodiment of the present invention. In some embodiments, semantic copy and paste interface 1000 is part of an automation executed by an RPA robot. Semantic copy and paste interface 1000 includes a copy and paste button 1010 and a close button 1030. Using semantic copy and paste interface 1000, a user can perform a copy and paste from a source to a target. The source and/or target may be files, application interfaces, or any other suitable vehicle that is capable of storing data without deviating from the scope of the invention, and the type of the source and the target may differ from one another.

Figure 10B:
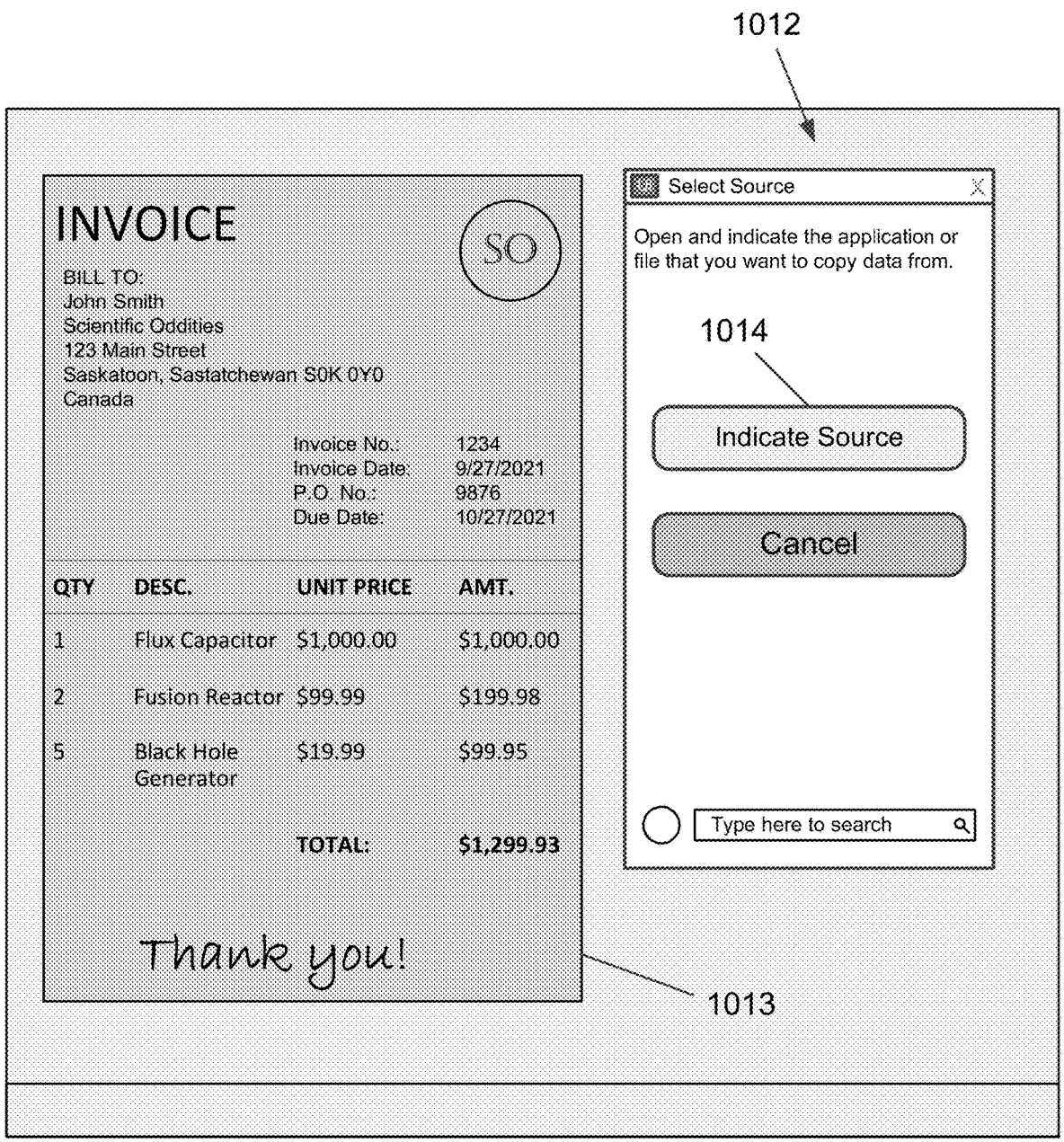

Upon clicking copy and paste button 1010, the application (e.g., an RPA robot executing an automation) asks the user to indicate an application or file that he or she wants to copy data from as a source via a source selection interface 1012. See FIG. 10B. When the user indicate source button 1014 of source selection interface 1012, indicate on screen functionality is enabled in some embodiments (e.g., the same as or similar to that provided by UiPath Studio™). The user can then select invoice 1016 as the source.

Figure 10C:
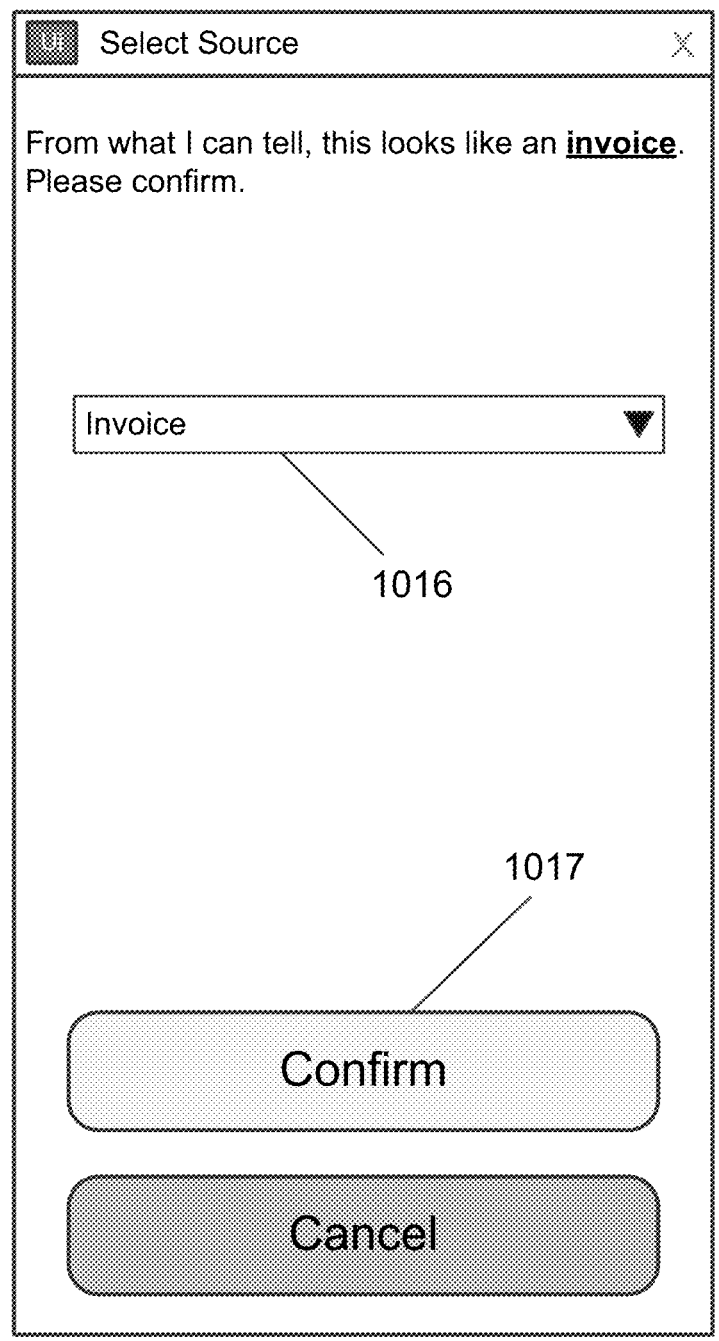

After indicating the source (i.e., invoice 1013 in this example), the semantic automation logic (i.e., the semantic matching AI/ML models(s)) can predict the type of the source using a classification algorithm, and data extraction interface 1012 displays its prediction of the type of the source in dropdown menu 1016. See FIG. 10C. However, in some embodiments, the user may not be prompted to confirm and/or select the source type. The user can confirm the prediction using confirm button 1017 or select another type from dropdown menu 1016. See FIG. 10D.

After the source is selected, the application asks the user to indicate the application or file that he or she wants to copy data to. See FIG. 10E. However, in some embodiments, the target may be selected first and/or the order of the selection of the source and the target does not matter. When the user clicks indicate target button 1024 of target selection interface 1022, indicate on screen functionality is enabled in this embodiment. The user can then select a web invoice processing page 1023 as the target.

Figure 10F:
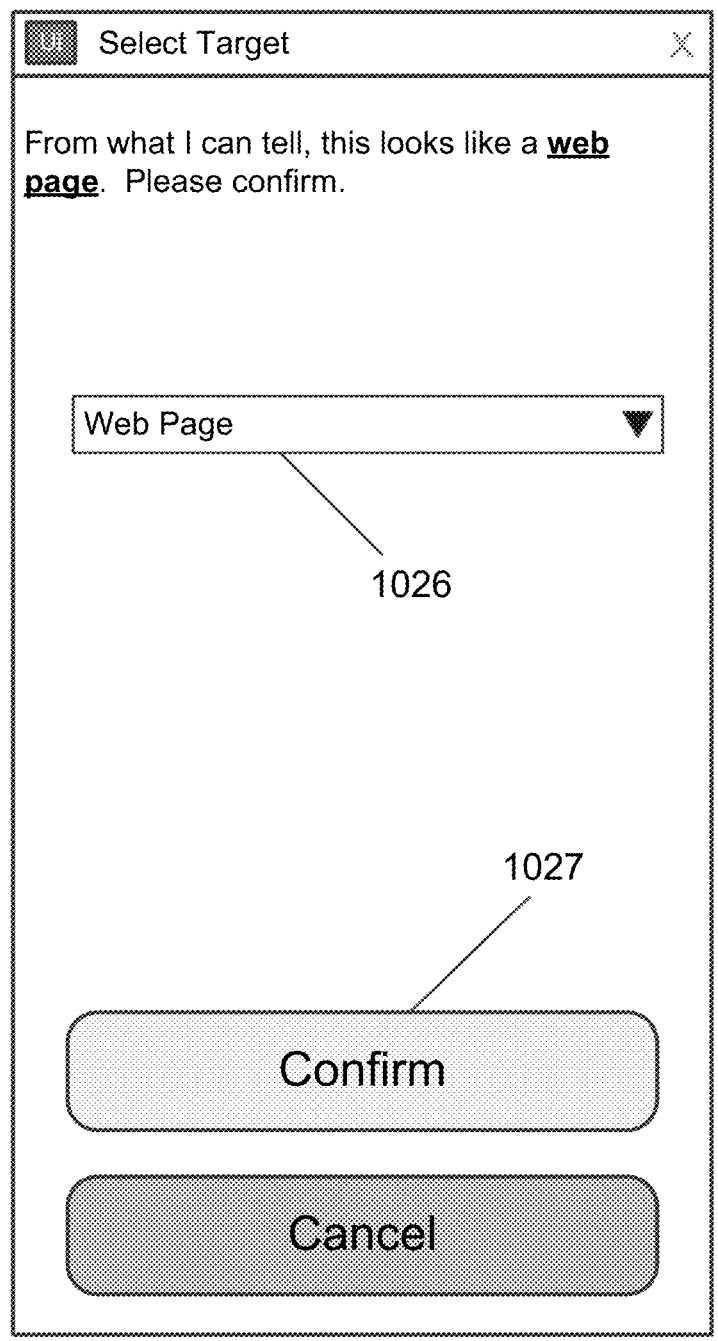
Figure 10G:
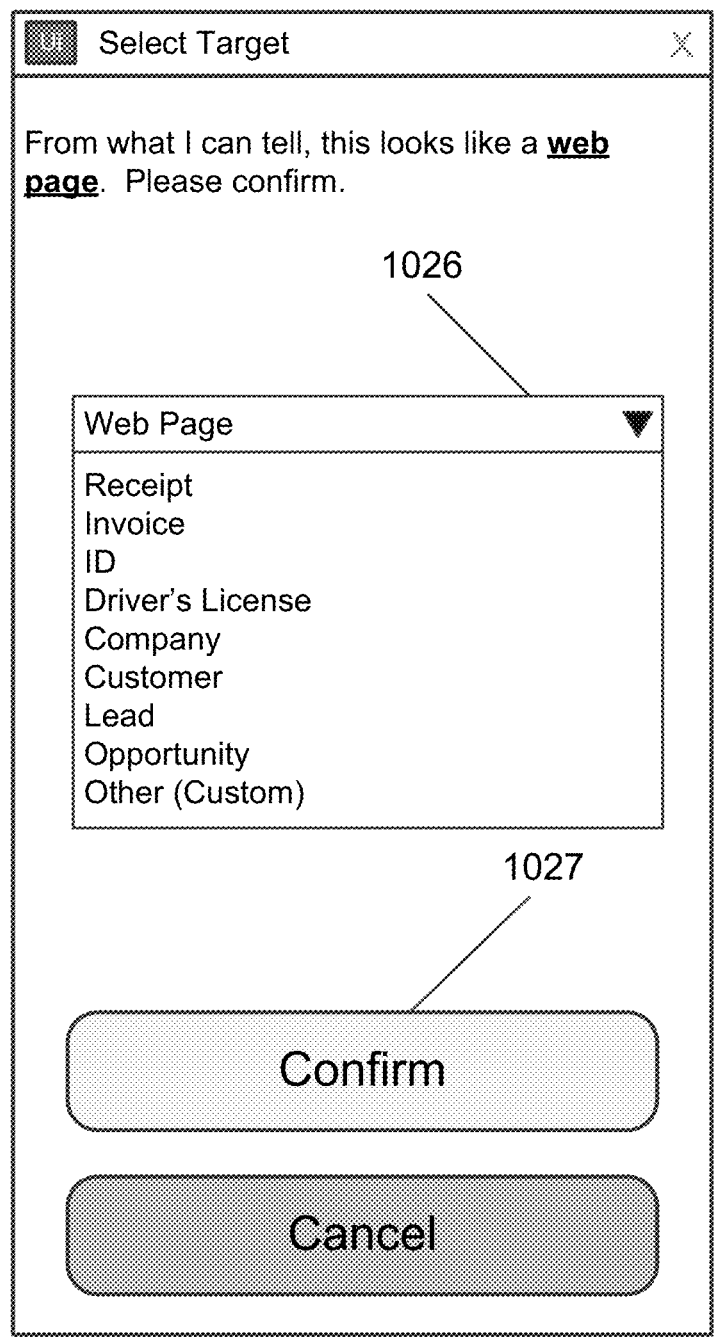
Figure 11:
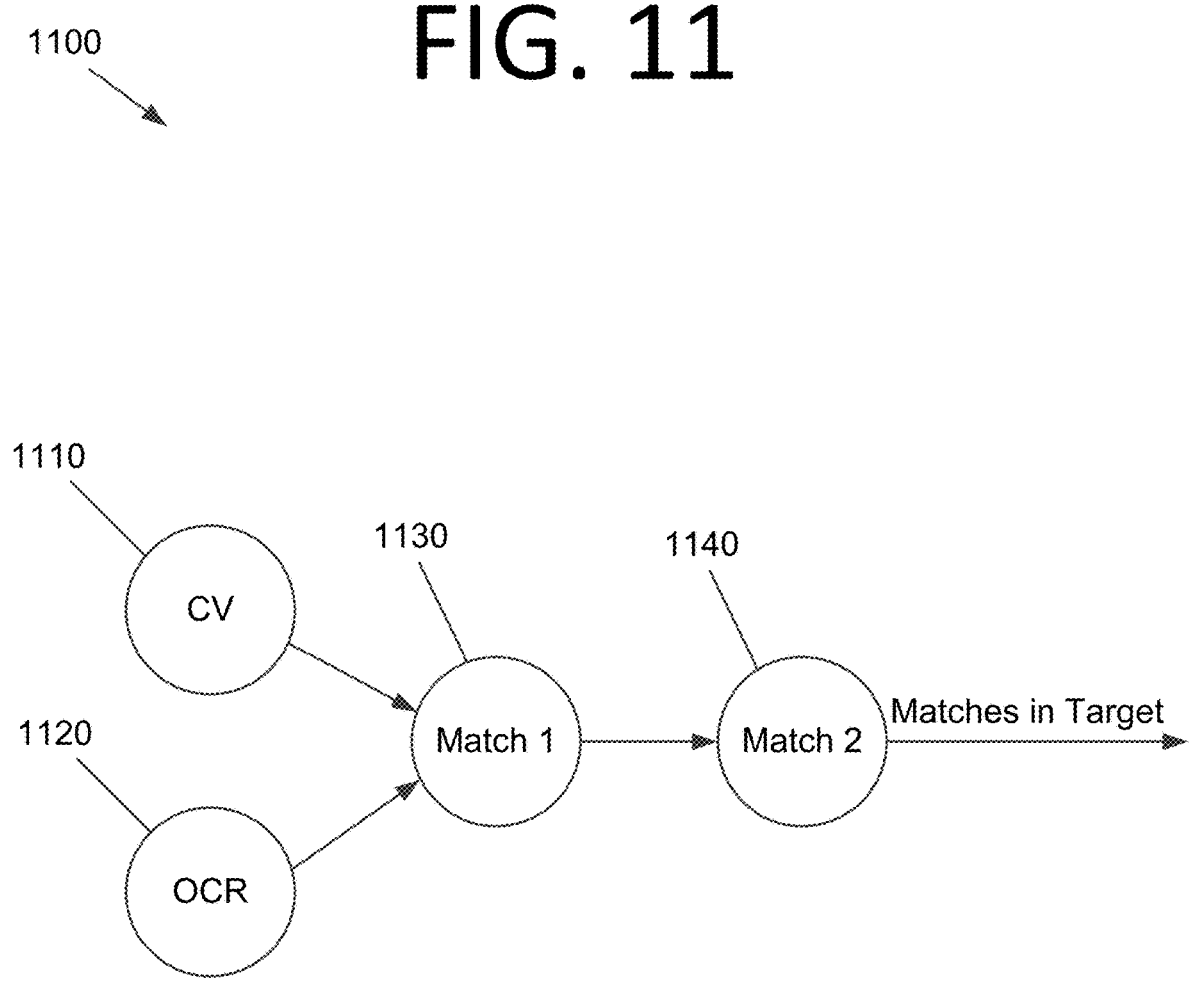
FIG. 11 is an architectural diagram illustrating an architecture of the AI/ML models for performing semantic AI, according to an embodiment of the present invention.

After indicating web invoice processing page 1023 as the target, the semantic automation logic can predict the type of the target using the classification algorithm, and target selection interface 1022 displays its prediction of the type of the target in dropdown menu 1026. See FIG. 10F. The user can confirm the prediction using confirm button 1027 or select another type from dropdown menu 1026. See FIG. 10G. After confirmation by the user, the application automatically populates web browser 1023 using the extracted data. See FIG. 10H.

Figure 12:
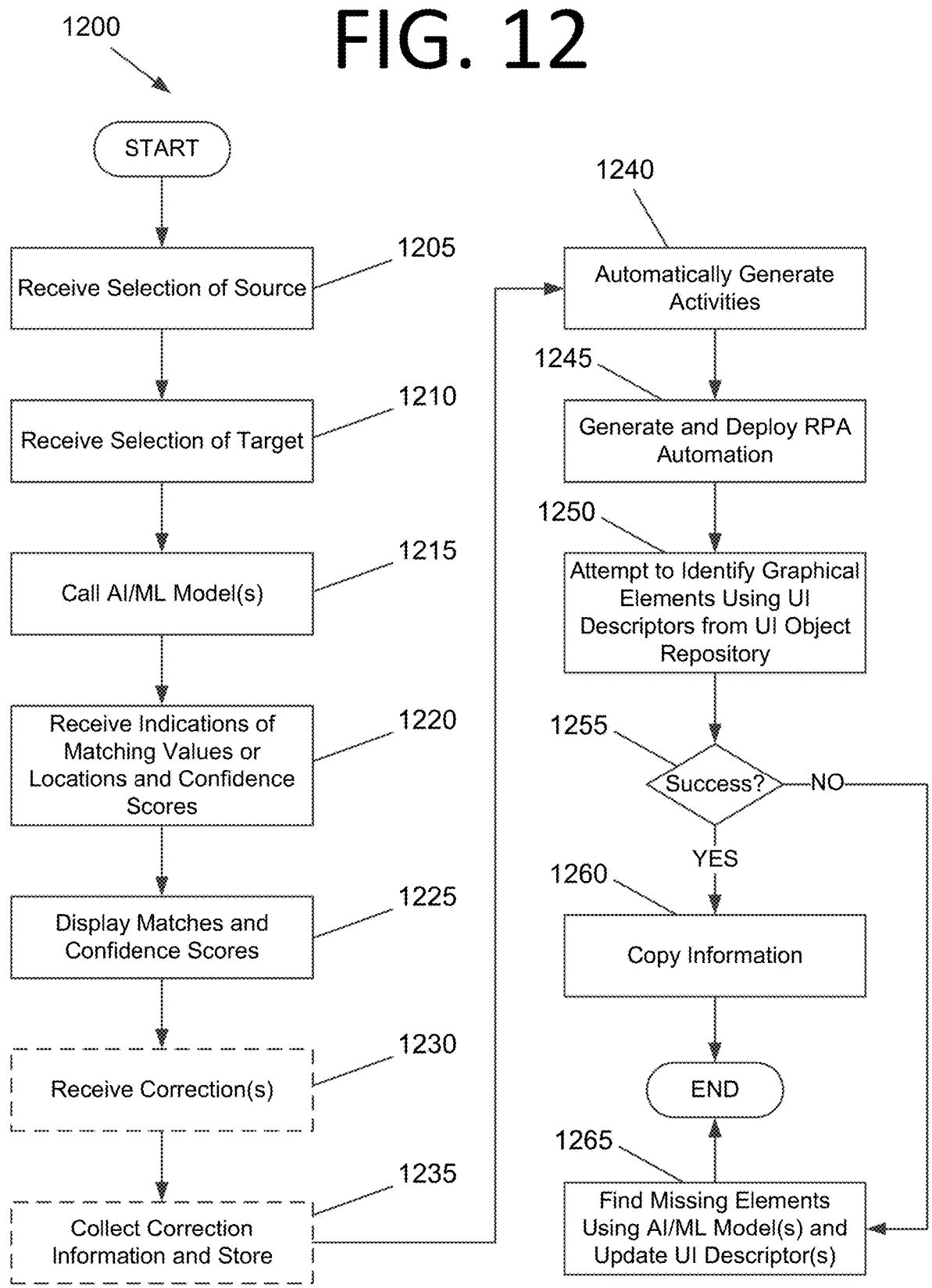
FIG. 12 is a flowchart illustrating a process for performing automatic data transfer between a source and a target using semantic AI for RPA at design time, according to an embodiment of the present invention.

FIG. 12 is an architectural diagram illustrating an architecture 1100 of the AI/ML models for performing semantic AI, according to an embodiment of the present invention. A CV model 1110 performs computer vision functionality to identify graphical elements in a screen and an OCR model 1120 performs text detection and recognition for the screen(s). In embodiments where both a source screen and a target screen are used, CV model 1110 and OCR model 1120 perform CV and OCR functionality on both screens.

CV model 1110 and OCR model 1120 then provide types, locations, sizes, text, etc. of the detected graphical elements and text in the target screen or both the target and source screen to a label matching model 1130 that matches labels from OCR model 1120 with graphical elements from CV model 1110. Matching labels and the associated graphical elements from the screen(s) are then passed to an input data matching model 1140, which matches input data from a source with labels in the target. The matches and the respective confidences are then provided as output from input data matching model 1140. In some embodiments, multiple AI/ML models may be used for input data matching that perform matching in different ways (e.g., they have different neural network architectures, employ different strategies, have been trained on different training data, etc.).

In some embodiments, the AI/ML model(s) may learn that fields with the same labels may have different context. For instance, both a billing information and a shipping information section of a screen may have an "Address" label, but the AI/ML model may learn that the pattern of the elements near one differs from those near the other. These sections of the screen may then be used as anchors in a multi-anchor technique where the text field is the target and the "Address" label and the section with the recognized pattern are the anchors. See, for example, U.S. Pat. Nos. 10,936,351 and 11,200,073.

FIG. 12 is a flowchart illustrating a process 1200 for performing automatic data transfer between a source and a target using semantic AI for RPA at design time, according to an embodiment of the present invention. The process begins with receiving a selection of a source at 1205 and receiving a selection of a target at 1210. One or more AI/ML models that have been trained to perform semantic matching and data transfer between the source and the target are then called at 1215. In some embodiments, the one or more AI/ML models are trained by providing words and phrases with semantic associations between the words and phrases such that similar words and phrases for a given word or phrase can be identified and providing contextual labels. In some embodiments, the one or more AI/ML models include a CV model, an OCR model, a label matching model, and an input data matching model, where the label matching model matches labels detected by the OCR model with fields detected by the CV model and the input data model receives the matching labels from the label matching model and semantically matches the data elements from the source or from the fields associated with the labels from the source with the fields associated with the semantically matched labels on the target.

Indications of values or locations associated with semantically matched labels in the target (e.g., locations, coordinates, type, etc.) and respective confidence scores from the one or more AI/ML models are received at 1220. The values or locations associated with the semantically matched labels, individual confidence scores, and a global confidence score are displayed on the source and/or target in a matching interface at 1225. For instance, the target screen may be shown and matching elements may be highlighted or otherwise made obvious to the developer. In some embodiments, connections are drawing between matching fields in the source screen or source data and the target screen. In certain embodiments, elements in the source screen or source data for which no match was found are highlighted or otherwise indicated to the developer.

Correction(s) to values or locations in the target screen identified by the one or more AI/ML models as having an associated semantically matching label, an indication of a new element in the target screen that was not semantically matched to a label in the source by the one or more AI/ML models, or both, are received at 1230. Information pertaining to the corrected and/or newly labeled values or locations in the target and the associated label are collected and stored either directly (i.e., stored directly in computing system memory) or indirectly (i.e., sent to an external system for storage) at 1235. Steps 1230 and 1235 are performed if such corrections are provided by the developer.

One or more activities in an RPA workflow that copy semantically matched data from the source to the target are automatically generated at 1240. In some embodiments, the automatic generation of the one or more activities includes determining the start of a copy-and-paste task (e.g., a copy operation), determining the end of the copy-and-paste task (e.g., a paste operation), determine operations in between (if any), and generate associated activities for these operations. An RPA automation implementing the one or more generated activities in the RPA workflow is generated and deployed at 1245.

At runtime, an RPA robot runs the automation to access UI descriptors for graphical elements it is trying to identify to perform the automation in accordance with the RPA workflow from a UI object repository and attempts to identify graphical elements in the target using these UI descriptors at 1250. If all target graphical elements can be identified at 1255, the information is copied from the source to the target at 1260. However, if all graphical elements cannot be found at 1255, the RPA robot calls the AI/ML model(s) to attempt to identify the missing graphical element(s) and updates the UI descriptors for these respective graphical elements at 1265. For instance, the RPA robot may use the descriptor information provided by the AI/ML model(s) to update the respective UI descriptors for the missing elements in the UI object repository so other RPA robots will not encounter the same issue in the future. In this sense, the system is self-healing.

Figure 13:
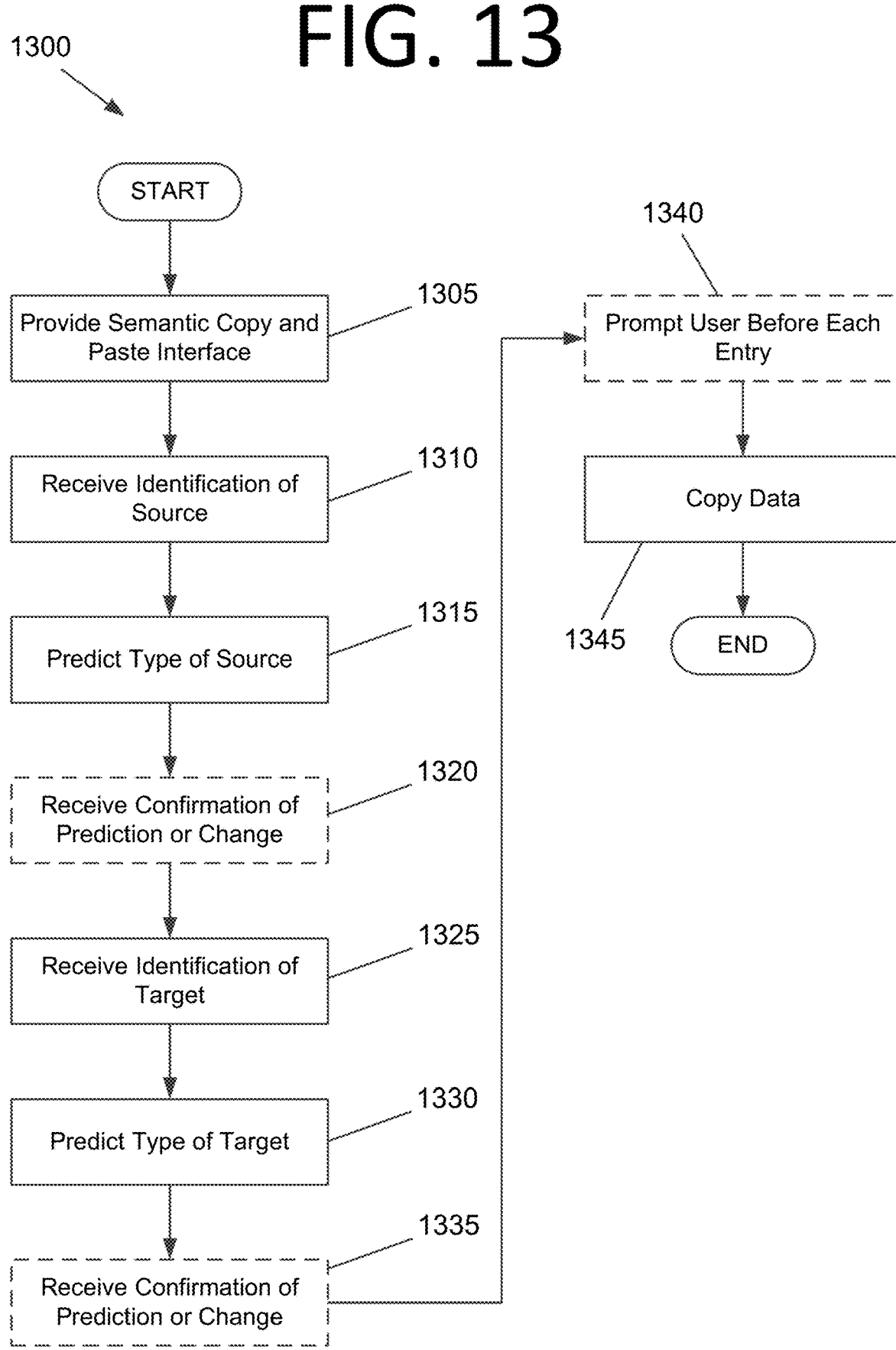
FIG. 13 is a flowchart illustrating a process for performing automatic data transfer between a source and a target using semantic AI for RPA at runtime, according to an embodiment of the present invention.

FIG. 13 is a flowchart illustrating a process 1300 for performing automatic data transfer between a source and a target using semantic AI for RPA at runtime, according to an embodiment of the present invention. The process begins with providing a semantic copy and paste interface at 1305. A source is identified at 1310. The type of the source is predicted using a classification algorithm at 1315. In some embodiments, the semantic copy and paste application waits to receive confirmation of the prediction or a change to the prediction by a user at 1320.

An indication of the target application is received at 1325. The type of the target is predicted using a classification algorithm at 1330. In some embodiments, the semantic copy and paste application waits to receive confirmation of the prediction or a change to the prediction by a user at 1335.

In some embodiments, the user is prompted before each data entry in the copy and paste functionality at 1340. For instance, before entering a given data item (e.g., a line of data, an individual graphical element, etc.), the user may see the data to be input appear in the target. The user may then preview and approve the entry or decline. Data from the source is then entered into the target at 1345.

In some embodiments, persistence of data across multiple screens and/or screen versions may be desired. For instance, an account creation process for an application may include multiple screens with various fields, some of which are potentially repeated. Additionally or alternatively, some labels/fields for a screen may not appear until some action is taken (e.g., selecting a radio button, clicking a checkbox, completing earlier entries, etc.).

Metadata from a user's clipboard and/or previous screen entries may be stored in a persistent data structure that persists and grows as each screen of information is completed. Values for labels (e.g., numbers, strings of alphanumeric values or characters, currency values, images in some embodiments, etc.) may automatically be added to associated fields if a confidence threshold is exceeded (e.g., 70%, 90%, 99%, etc.), depending on the accuracy from training. However, if this confidence threshold (i.e., an autocompletion threshold) is not met for a label, the user may be presented with options that are above a second, lower suggestion threshold (e.g., 40%, 60%, 75%, etc.). These options may be provided when the user clicks on the field, hovers the mouse over the field, etc. The user can then select a value from these options or add a different value. This value is then added to the persistent data structure for that label.

As information is added to the screens and the persistent data structure grows, the semantic associations and suggestions may become more accurate. Also, classification of the document, application, webpage(s), etc. that is being completed becomes more accurate or potentially possible if not previously possible before data entry. In this manner, the semantic features may progressively improve. In certain embodiments, the persistent data structure(s) from previous data entry sessions may be used to make the semantic logic more accurate and/or to provide templates for future completions. The data structure may include associations of labels to values, and potentially associations of label/value pairs to screen(s), which may assist in template functionality.

Figure 14:
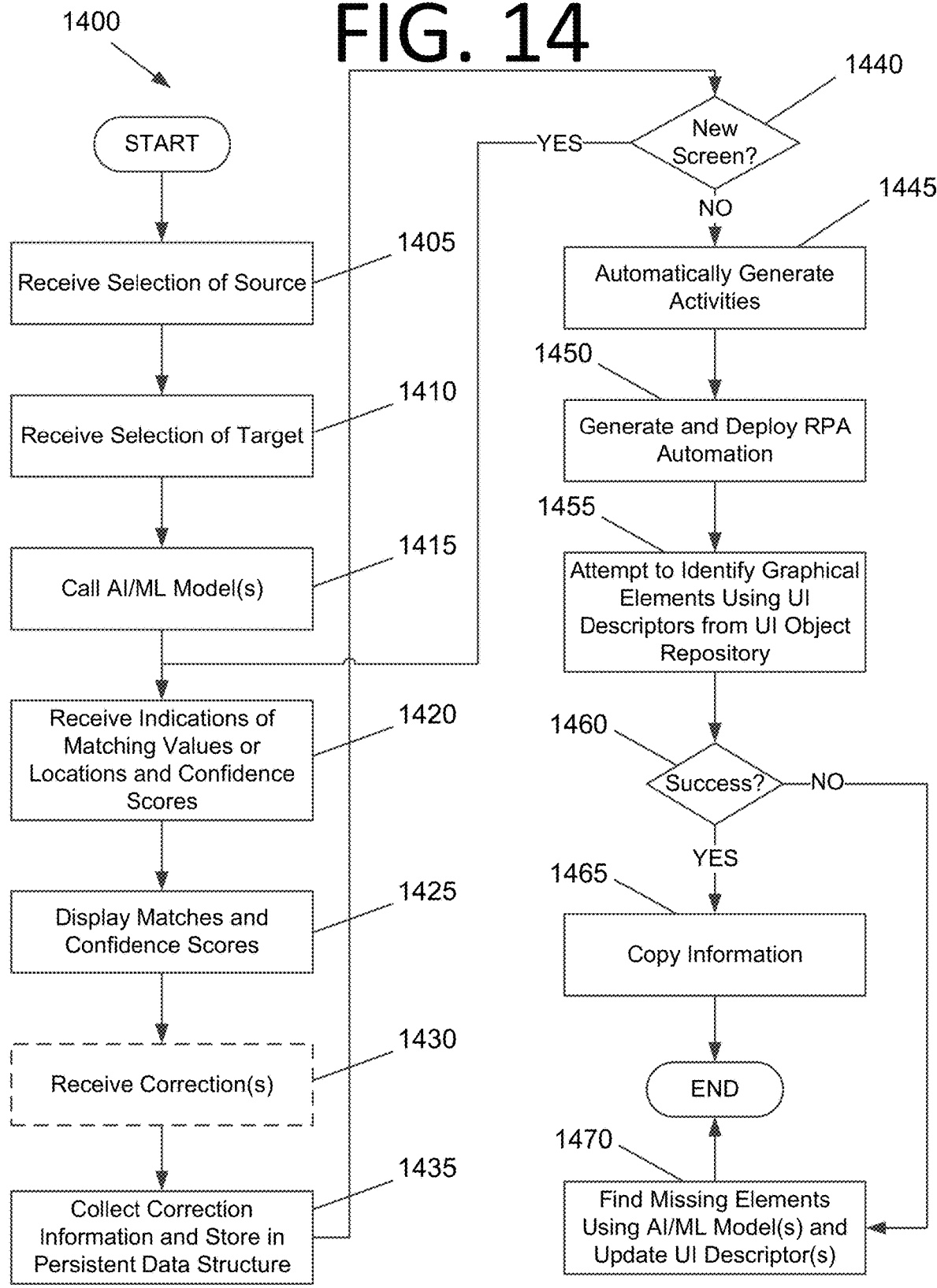
FIG. 14 is a flowchart illustrating a process for performing persistent, multi-screen automatic data transfer between a source and a target using semantic AI for RPA at design time, according to an embodiment of the present invention.

FIG. 14 is a flowchart illustrating a process 1400 for performing automatic persistent, multi-screen data transfer between a source and a target using semantic AI for RPA at design time, according to an embodiment of the present invention. The process begins with receiving a selection of a source at 1405 and receiving a selection of a target at 1410. One or more AI/ML models that have been trained to perform semantic matching and data transfer between the source and the target are then called at 1415. In some embodiments, the one or more AI/ML models are trained by providing words and phrases with semantic associations between the words and phrases such that similar words and phrases for a given word or phrase can be identified and providing contextual labels. In some embodiments, the one or more AI/ML models include a CV model, an OCR model, a label matching model, and an input data matching model, where the label matching model matches labels detected by the OCR model with fields detected by the CV model and the input data model receives the matching labels from the label matching model and semantically matches the data elements from the source or from the fields associated with the labels from the source with the fields associated with the semantically matched labels on the target.

Indications of values or locations associated with semantically matched labels in the target (e.g., locations, coordinates, type, etc.) and respective confidence scores from the one or more AI/ML models are received at 1420. The values or locations associated with the semantically matched labels, individual confidence scores, and a global confidence score are displayed on the source and/or target in a matching interface at 1425. For instance, the target screen may be shown and matching elements may be highlighted or otherwise made obvious to the developer. In some embodiments, connections are drawing between matching fields in the source screen or source data and the target screen. In certain embodiments, elements in the source screen or source data for which no match was found are highlighted or otherwise indicated to the developer.

Correction(s) to values or locations in the target screen identified by the one or more AI/ML models as having an associated semantically matching label, an indication of a new element in the target screen that was not semantically matched to a label in the source by the one or more AI/ML models, or both, are received at 1430. Information pertaining to the corrected and/or newly labeled values or locations in the target and the associated label are collected and stored either directly (i.e., stored directly in computing system memory) or indirectly (i.e., sent to an external system for storage) in a persistent data structure that includes label/field associations at 1435. If there is a new screen and/or a modification to a current screen such that fields that were either not visible or completion of which was blocked by the application (e.g., grayed out and not fillable by a user) at 1440, the process returns to step 1420 for that screen.

One or more activities in an RPA workflow that copy semantically matched data from the source to the target are automatically generated at 1445. In some embodiments, the automatic generation of the one or more activities includes determining the start of a copy-and-paste task (e.g., a copy operation), determining the end of the copy-and-paste task (e.g., a paste operation), determine operations in between (if any), and generate associated activities for these operations. An RPA automation implementing the one or more generated activities in the RPA workflow is generated and deployed at 1450.

At runtime, an RPA robot runs the automation to access UI descriptors for graphical elements it is trying to identify to perform the automation in accordance with the RPA workflow from a UI object repository and attempts to identify graphical elements in the target using these UI descriptors at 1455. If all target graphical elements can be identified at 1460, the information is copied from the source to the target at 1465. However, if all graphical elements cannot be found at 1460, the RPA robot calls the AI/ML model(s) to attempt to identify the missing graphical element(s) and updates the UI descriptors for these respective graphical elements at 1470. For instance, the RPA robot may use the descriptor information provided by the AI/ML model(s) to update the respective UI descriptors for the missing elements in the UI object repository so other RPA robots will not encounter the same issue in the future. In this sense, the system is self-healing.

Figure 15:
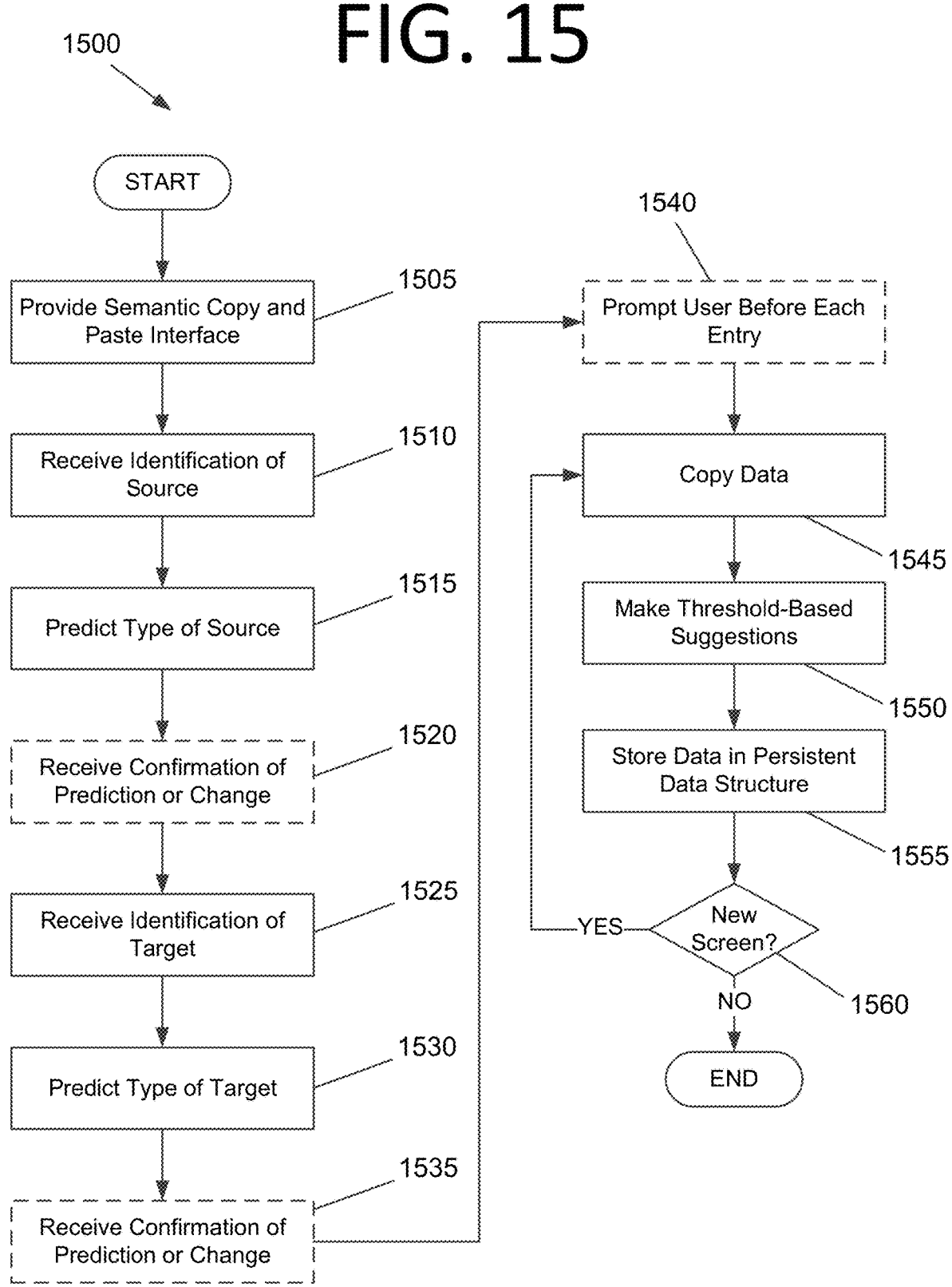
FIG. 15 is a flowchart illustrating a process for performing persistent, multi-screen automatic data transfer between a source and a target using semantic AI for RPA at runtime, according to an embodiment of the present invention.

FIG. 15 is a flowchart illustrating a process 1500 for performing persistent, multi-screen automatic data transfer between a source and a target using semantic AI for RPA at runtime, according to an embodiment of the present invention. The process begins with providing a semantic copy and paste interface at 1505. A source is identified at 1510. The type of the source is predicted using a classification algorithm at 1515. In some embodiments, the semantic copy and paste application waits to receive confirmation of the prediction or a change to the prediction by a user at 1520.

An indication of the target application is received at 1525. The type of the target is predicted using a classification algorithm at 1530. In some embodiments, the semantic copy and paste application waits to receive confirmation of the prediction or a change to the prediction by a user at 1535.

In some embodiments, the user is prompted before each data entry in the copy and paste functionality at 1540. For instance, before entering a given data item (e.g., a line of data, an individual graphical element, etc.), the user may see the data to be input appear in the target. The user may then preview and approve the entry or decline. Data from the source is then entered into the target at 1545.

Suggestions may be presented to the user at 1550 for labels/fields that do not meet a first autocompletion confidence threshold but are above a second, lower suggestion confidence threshold. These suggestions may be based at least in part on data in a persistent data structure. Values for labels/fields that have been entered are stored in the persistent data structure at 1555. If there is a new screen and/or a modification to a current screen such that fields that were either not visible or completion of which was blocked by the application (e.g., grayed out and not fillable by a user) at 1560, the process returns to step 1545 for that screen.

The process steps performed in FIGS. 12-15 may be performed by a computer program, encoding instructions for the processor(s) to perform at least part of the process(es) described in FIGS. 12-15, in accordance with embodiments of the present invention. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., processor(s) 510 of computing system 500 of FIG. 5) to implement all or part of the process steps described in FIGS. 12-15, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiments," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A non-transitory computer-readable medium storing a computer program, the computer program configured to cause at least one processor to:
receive a selection of a source from a user via a graphical user interface (GUI) and/or an input device;
receive a selection of a target from the user via the GUI and/or the input device;
call one or more artificial intelligence/machine learning (AI/ML) models that have been trained to perform semantic matching between labels in the source and labels in the target, between values in the source and the labels in the target, or both, the one or more AI/ML models configured to suggest matches between the labels in the source and the labels in the target, between the values in the source and the labels in the target, or both, and respective confidence scores;
receive the suggested matches and respective confidence scores;
automatically copy values from the source to the target based on the semantic matching between the labels in the source and the labels in the target, between the values in the source and the labels in the target, or both, responsive to the matches exceeding a threshold confidence score; and
display the automatically copied values in the GUI.

2. The non-transitory computer-readable medium of claim 1, wherein the computer program is further configured to cause the at least one processor to:
generate one or more activities in a robotic process automation (RPA) workflow that copy data from the values in the source having labels that the one or more AI/ML models identified as semantically matching the labels in the target into respective fields or locations in the target.

3. The non-transitory computer-readable medium of claim 2, wherein the computer program is further configured to cause the at least one processor to:
generate an automation implementing the one or more generated activities in the RPA workflow; and
deploy the generated automation and an RPA robot configured to execute the automation in a runtime environment.

4. The non-transitory computer-readable medium of claim 2, wherein the computer program is further configured to cause the at least one processor to:
determine a start of a copy-and-paste task;
determine an end of the copy-and-paste task; and
generate associated activities for the start and the end of the copy-and-paste task.

5. The non-transitory computer-readable medium of claim 1, wherein the computer program is further configured to cause the at least one processor to:
receive indications of fields or locations in the source associated with semantically matched labels in the target and respective confidence scores from the one or more AI/ML models; and
display the graphical elements or locations associated with the semantically matched labels on the target in a matching interface, display the respective confidence scores for the potential matching fields or locations identified by the one or more AI/ML models in the matching interface, or both.

6. The non-transitory computer-readable medium of claim 1, wherein the computer program is further configured to cause the at least one processor to:
receive a correction to a label, field, or location in the target identified by the one or more AI/ML models as having an associated semantically matching label in the source, receive an indication of a new label, field, or location in the target that was not semantically matched to a label in the source by the one or more AI/ML models, or both;
collect information pertaining to the corrected and/or newly labeled label, field, or location in the target and the associated label in the source; and
directly or indirectly store the collected information for retraining of the one or more AI/ML models.

7. The non-transitory computer-readable medium of claim 1, wherein the computer program is further configured to cause the at least one processor to:
generate a composite confidence score from the confidence scores for the fields or locations associated with semantically matched labels in the target; and
display the composite confidence score in the matching interface.

8. The non-transitory computer-readable medium of claim 1, wherein the one or more AI/ML models are trained by providing words and phrases with semantic associations between the words and phrases such that similar words and phrases for a given word or phrase can be identified, and providing contextual labels pertaining to a screen in which the words and phrases appear.

9. The non-transitory computer-readable medium of claim 1, wherein the computer program is or comprises a robotic process automation (RPA) designer application.

10. The non-transitory computer-readable medium of claim 1, wherein
the one or more AI/ML models comprise a computer vision (CV) model, an optical character recognition (OCR) model, a label matching model, and an input data matching model,
the label matching model matches labels detected by the OCR model with fields or locations detected by the CV model, and
the input data model receives the matching labels from the label matching model and semantically matches the labels and values from the source with the labels and fields or locations associated with the semantically matched labels on the target.

11. The non-transitory computer-readable medium of claim 1, wherein the computer program is or comprises a robotic process automation (RPA) robot.

12. The non-transitory computer-readable medium of claim 1, wherein the computer program is further configured to cause the at least one processor to:
display a type selection interface providing options for supported types for the source, the target, or both.

13. The non-transitory computer-readable medium of claim 1, wherein the source comprises content from a clipboard of an operating system.

14. The non-transitory computer-readable medium of claim 1, wherein the computer program is further configured to cause the at least one processor to:
select at least one additional source; and
provide information from the at least one additional source to the one or more AI/ML models in addition to information from the source to perform the semantic matching.

15. A computer-implemented method, comprising:
receiving, by a computing system, a selection of a source from a user via a graphical user interface (GUI) and/or an input device;
receiving, by the computing system, a selection of a target from the user via the GUI and/or the input device;
calling, by a computing system, one or more artificial intelligence/machine learning (AI/ML) models that have been trained to perform semantic matching between labels in a source and labels in a target, between values in the source and the labels in the target, or both, the one or more AI/ML models configured to suggest matches between the labels in the source and the labels in the target, between the values in the source and the labels in the target, or both, and respective confidence scores;
receiving, by the computing system, the suggested matches and respective confidence scores;
automatically copying values from the source to the target, by the computing system, based on the semantic matching between the labels in the source and the labels in the target, between the values in the source and the labels in the target, or both; and
displaying, by the computing system, the automatically copied values in the GUI.

16. The computer-implemented method of claim 15, further comprising:
generating, by the computing system, one or more activities in a robotic process automation (RPA) workflow that copy data from the values in the source having labels that the one or more AI/ML models identified as semantically matching the labels in the target into respective fields or locations in the target.

17. The computer-implemented method of claim 16, further comprising:
generating an automation implementing the one or more generated activities in the RPA workflow, by the computing system; and
deploying the generated automation and an RPA robot configured to execute the automation in a runtime environment, by the computing system.

18. The computer-implemented method of claim 16, further comprising:
determining, by the computing system, a start of a copy-and-paste task;
determining, by the computing system, an end of the copy-and-paste task; and
generating, by the computing system, associated activities for the start and the end of the copy-and-paste task.

19. The computer-implemented method of claim 15, further comprising:
receiving indications of fields or locations in the source associated with semantically matched labels in the target and respective confidence scores from the one or more AI/ML models, by the computing system; and
displaying, by the computing system, the graphical elements or locations associated with the semantically matched labels on the target in a matching interface, displaying the respective confidence scores for the potential matching fields or locations identified by the one or more AI/ML models in the matching interface, or both.

20. The computer-implemented method of claim 15, further comprising:
receiving, by the computing system, a correction to a label, field, or location in the target identified by the one or more AI/ML models as having an associated semantically matching label in the source, receiving an indication of a new label, field, or location in the target that was not semantically matched to a label in the source by the one or more AI/ML models, or both;
collecting information pertaining to the corrected and/or newly labeled label, field, or location in the target and the associated label in the source, by the computing system; and
directly or indirectly storing the collected information for retraining of the one or more AI/ML models, by the computing system.

21. The computer-implemented method of claim 15, further comprising:
generating a composite confidence score from the confidence scores for the fields or locations associated with semantically matched labels in the target, by the computing system; and
displaying the composite confidence score in the matching interface, by the computing system.

22. The computer-implemented method of claim 15, wherein the one or more AI/ML models are trained by providing words and phrases with semantic associations between the words and phrases such that similar words and phrases for a given word or phrase can be identified, and providing contextual labels pertaining to a screen in which the words and phrases appear.

23. The computer-implemented method of claim 15, wherein
the one or more AI/ML models comprise a computer vision (CV) model, an optical character recognition (OCR) model, a label matching model, and an input data matching model,
the label matching model matches labels detected by the OCR model with fields or locations detected by the CV model, and
the input data model receives the matching labels from the label matching model and semantically matches the labels and values from the source with the labels and fields or locations associated with the semantically matched labels on the target.

24. The computer-implemented method of claim 15, further comprising:
displaying, by the computing system, a type selection interface providing options for supported types for the source, the target, or both.

25. The computer-implemented method of claim 15, wherein the source comprises content from a clipboard of an operating system.

26. The computer-implemented method of claim 15, wherein the one or more AI/ML models use information from a plurality of sources to perform the semantic matching between labels in the plurality of sources and the labels in the target, between the values in the plurality of sources and the labels in the target, or both.

27. A computing system, comprising:
memory storing computer program instructions; and
at least one processor configured to execute the computer program instructions, wherein the computer program instructions are configured to cause the at least one processor to:
receive a selection of a source from a user via a graphical user interface (GUI) and/or an input device;
receive a selection of a target from the user via the GUI and/or the input device;
call one or more artificial intelligence/machine learning (AI/ML) models that have been trained to perform semantic matching between labels in the source and labels in the target, between values in the source and the labels in the target, or both, the one or more AI/ML models configured to suggest matches between the labels in the source and the labels in the target, between the values in the source and the labels in the target, or both, and respective confidence scores; and
automatically copy values from the source to the target based on the semantic matching between the labels in the source and the labels in the target, between the values in the source and the labels in the target, or both, responsive to the matches exceeding a threshold confidence score; and
display the automatically copied values in the GUI, wherein
the computer program instructions are or comprise a robotic process automation (RPA) designer application or an RPA robot.

28. The computing system of claim 27, wherein the computer program instructions are further configured to cause the at least one processor to:
generate one or more activities in an RPA workflow that copy data from the values in the source having labels that the one or more AI/ML models identified as semantically matching the labels in the target into respective fields or locations in the target.

29. The computing system of claim 27, wherein the computer program instructions are further configured to cause the at least one processor to:
generate an automation implementing the one or more generated activities in the RPA workflow; and
deploy the generated automation and an RPA robot configured to execute the automation in a runtime environment.

30. The computing system of claim 27, wherein the computer program instructions are further configured to cause the at least one processor to:
determine a start of a copy-and-paste task;
determine an end of the copy-and-paste task; and
generate associated activities for the start and the end of the copy-and-paste task.

31. The computing system of claim 27, wherein the computer program instructions are further configured to cause the at least one processor to:
receive indications of fields or locations in the source associated with semantically matched labels in the target and respective confidence scores from the one or more AI/ML models; and
display the graphical elements or locations associated with the semantically matched labels on the target in a matching interface, display the respective confidence scores for the potential matching fields or locations identified by the one or more AI/ML models in the matching interface, or both.

32. The computing system of claim 27, wherein the computer program instructions are further configured to cause the at least one processor to:
receive a correction to a label, field, or location in the target identified by the one or more AI/ML models as having an associated semantically matching label in the source, receive an indication of a new label, field, or location in the target that was not semantically matched to a label in the source by the one or more AI/ML models, or both;
collect information pertaining to the corrected and/or newly labeled label, field, or location in the target and the associated label in the source; and
directly or indirectly store the collected information for retraining of the one or more AI/ML models.

33. The computing system of claim 27, wherein the computer program instructions are further configured to cause the at least one processor to:
generate a composite confidence score from the confidence scores for the fields or locations associated with semantically matched labels in the target; and
display the composite confidence score in the matching interface.

34. The computing system of claim 27, wherein the one or more AI/ML models are trained by providing words and phrases with semantic associations between the words and phrases such that similar words and phrases for a given word or phrase can be identified, and providing contextual labels pertaining to a screen in which the words and phrases appear.

35. The computing system of claim 27, wherein
the one or more AI/ML models comprise a computer vision (CV) model, an optical character recognition (OCR) model, a label matching model, and an input data matching model,
the label matching model matches labels detected by the OCR model with fields or locations detected by the CV model, and
the input data model receives the matching labels from the label matching model and semantically matches the labels and values from the source with the labels and fields or locations associated with the semantically matched labels on the target.

36. The computing system of claim 27, wherein the computer program instructions are further configured to cause the at least one processor to:
display a type selection interface providing options for supported types for the source, the target, or both.

37. The computing system of claim 27, wherein the source comprises content from a clipboard of an operating system.

38. The computing system of claim 27, wherein the one or more AI/ML models use information from a plurality of sources to perform the semantic matching between labels in the plurality of sources and the labels in the target, between the values in the plurality of sources and the labels in the target, or both.

* * * * *